United States Patent
Park et al.

(10) Patent No.: US 7,379,609 B2
(45) Date of Patent: May 27, 2008

(54) IMAGE PROCESSING APPARATUS AND METHOD FOR CONVERSION BETWEEN RASTER AND BLOCK FORMATS

(75) Inventors: Hyun-sang Park, Chungcheongnam-do (KR); Sun-young Shin, Gyeonggi-Do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 839 days.

(21) Appl. No.: 10/390,638

(22) Filed: Mar. 19, 2003

(65) Prior Publication Data

US 2004/0013316 A1  Jan. 22, 2004

(30) Foreign Application Priority Data

Jul. 19, 2002  (KR) .................. P2002-0042603
Jul. 30, 2002  (KR) .................. P2002-0044991

(51) Int. Cl.
*G06K 9/00* (2006.01)
*G06K 9/36* (2006.01)
*G06K 9/46* (2006.01)
*G06F 12/06* (2006.01)
*H04B 1/66* (2006.01)
*H04N 7/12* (2006.01)
*H04N 11/02* (2006.01)
*H04N 11/04* (2006.01)

(52) U.S. Cl. .............. 382/248; 382/166; 382/276; 345/574; 348/403.1; 375/240.18; 375/240.24

(58) Field of Classification Search ................ 382/166, 382/232, 248, 253, 276, 293; 345/572–574; 348/395.1, 420.1, 441, 403.1; 375/240.24, 375/240.18, 240.19, 240.2

See application file for complete search history.

(56) References Cited

U.S. PATENT DOCUMENTS 5,343,243 A * 8/1994 Maeda ................. 348/222.1

(Continued)

FOREIGN PATENT DOCUMENTS

CN  1192106  9/1998

(Continued)

OTHER PUBLICATIONS

Bhaskaran et al. (Image and Video Compression Standards-Algorithms and Architectures, 2nd ed., 1997, pp. 152-153).*

(Continued)

*Primary Examiner*—Matthew Bella
*Assistant Examiner*—Yubin Hung
(74) *Attorney, Agent, or Firm*—Harness, Dickey & Pierce, P.L.C.

(57) ABSTRACT

An image processing apparatus for converting image data between a raster format and a block format including an image data processor for providing the image data including a luminance component and at least one chrominance component in the raster format, at least two FIFO memories for storing corresponding image data components, a multiplexer for multiplexing the image data components from the at least two FIFO memories, a line buffer memory for storing outputs of the multiplexer linearly, and an image compressor for receiving the image data components in block format in sequence from the unified line buffer memory and compressing the received image data components. The image processing apparatus may also include an address generator for generating a common read/write address for the line buffer memory.

17 Claims, 26 Drawing Sheets

U.S. PATENT DOCUMENTS

| | | | | |
|---|---|---|---|---|
| 5,446,560 | A | * | 8/1995 | Schwartz ..................... 358/445 |
| 5,761,200 | A | * | 6/1998 | Hsieh ......................... 370/364 |
| 5,819,035 | A | * | 10/1998 | Devaney et al. ............ 709/202 |
| 5,982,396 | A | | 11/1999 | Kim |
| 5,982,443 | A | * | 11/1999 | Chung ........................ 348/441 |
| 6,122,315 | A | * | 9/2000 | Barnes .................. 375/240.12 |
| 6,212,300 | B1 | * | 4/2001 | Rengakuji ................... 382/232 |
| 6,317,515 | B1 | * | 11/2001 | Kurtze et al. ............... 382/166 |
| 6,411,656 | B1 | * | 6/2002 | Bors .......................... 375/285 |

FOREIGN PATENT DOCUMENTS

| JP | 10-341456 | 12/1998 |
|---|---|---|
| JP | 11-261949 | 9/1999 |

OTHER PUBLICATIONS

Chinese Office Action with English translation dated Apr. 14, 2006.

Korean Notice to File Response/Amendment with English translation dated Jul. 21, 2006.

Examination Report from corresponding Korean Application No. 10-2003-0020170.

Examination Report from Korean Application No. 10-2006-0004423 (divisional of corresponding Korean Application No. 10-2003-0020170).

* cited by examiner

Fig. 1A
(CONVENTIONAL)
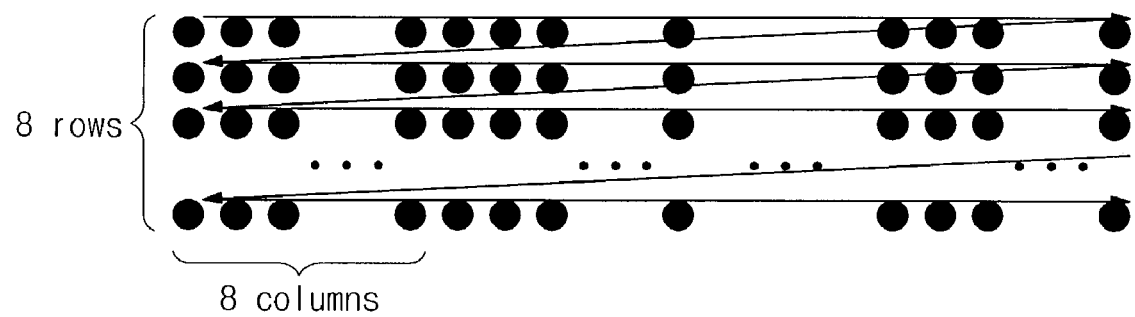
Fig. 1B
(CONVENTIONAL)
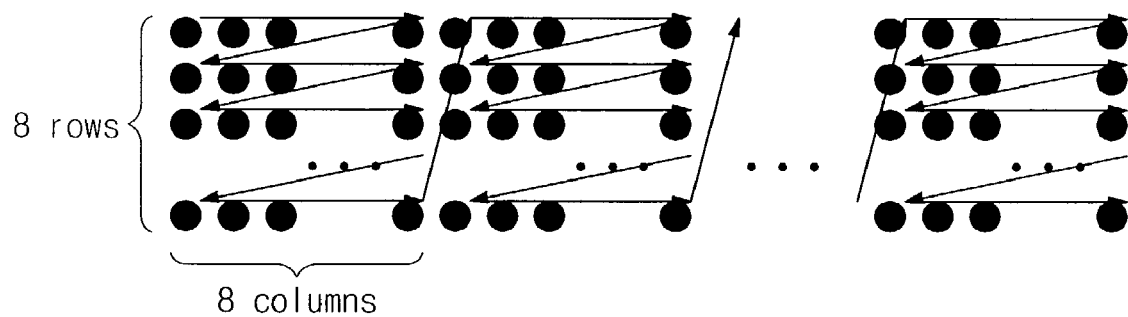

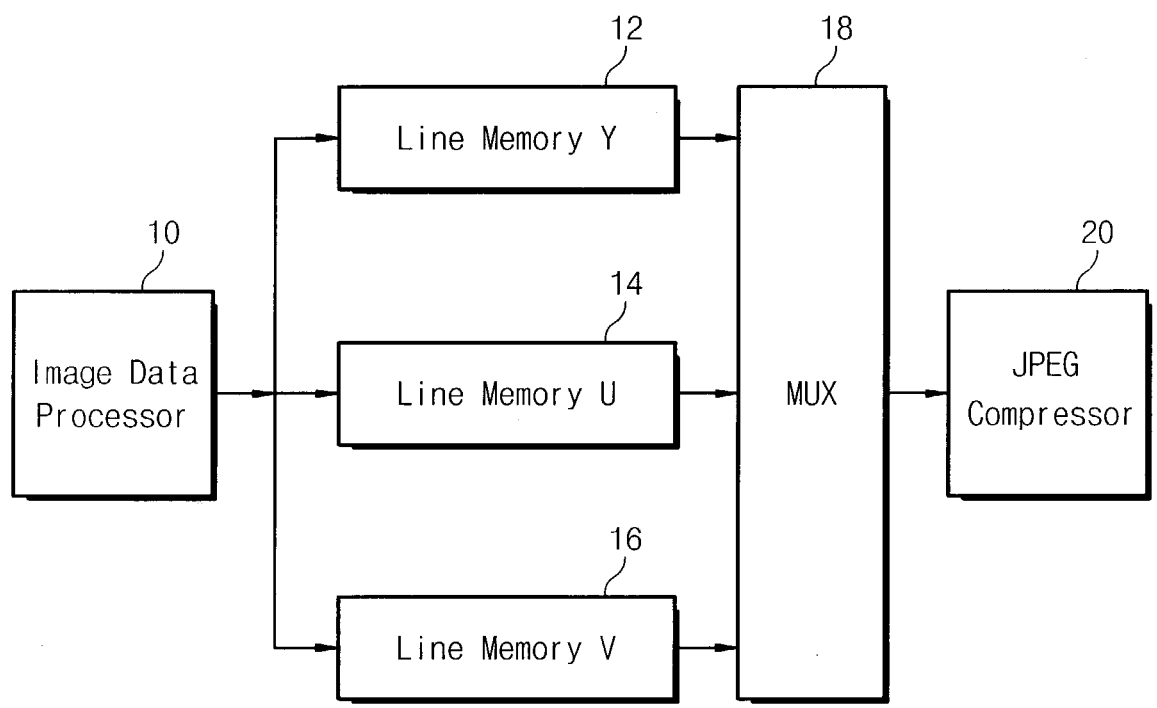
Fig. 2
(CONVENTIONAL)

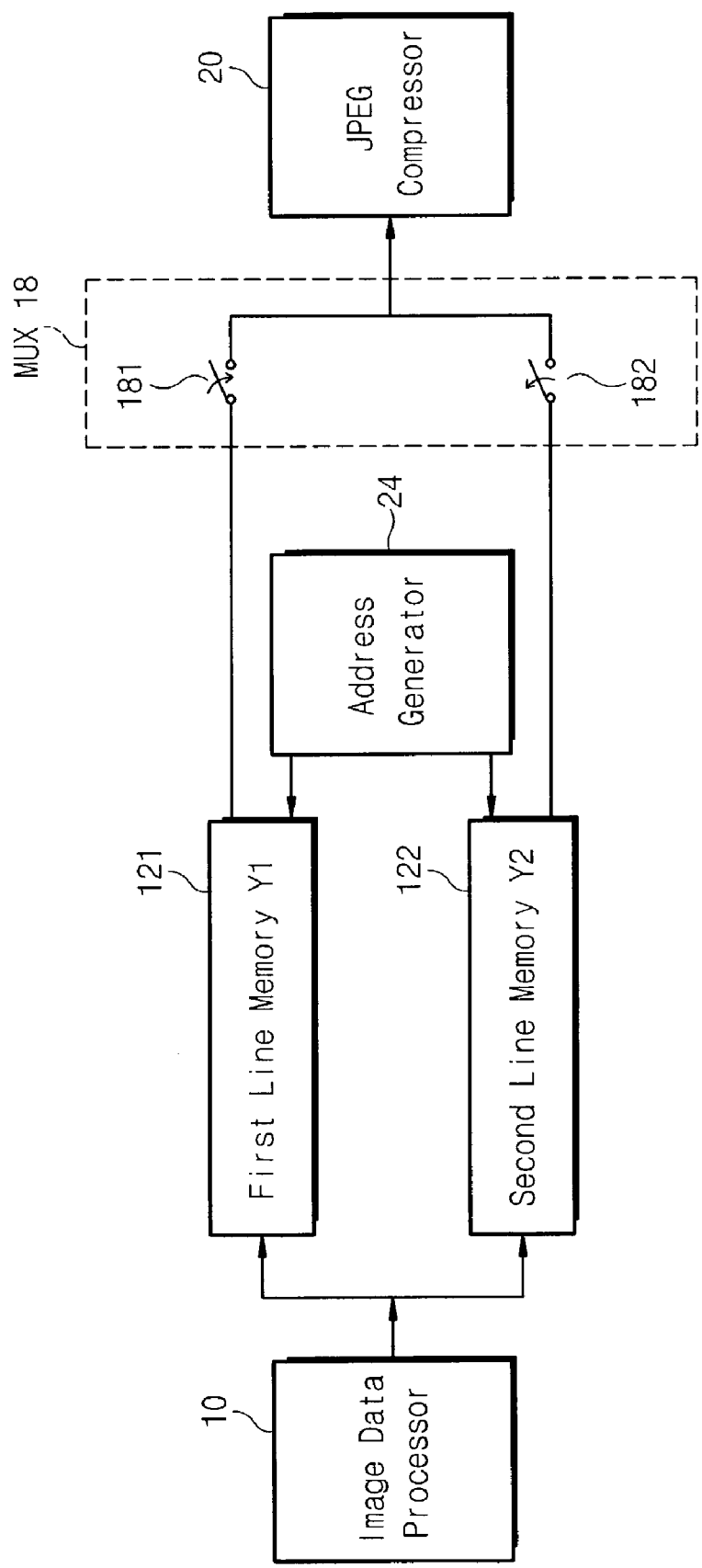
Fig. 3A
(CONVENTIONAL)

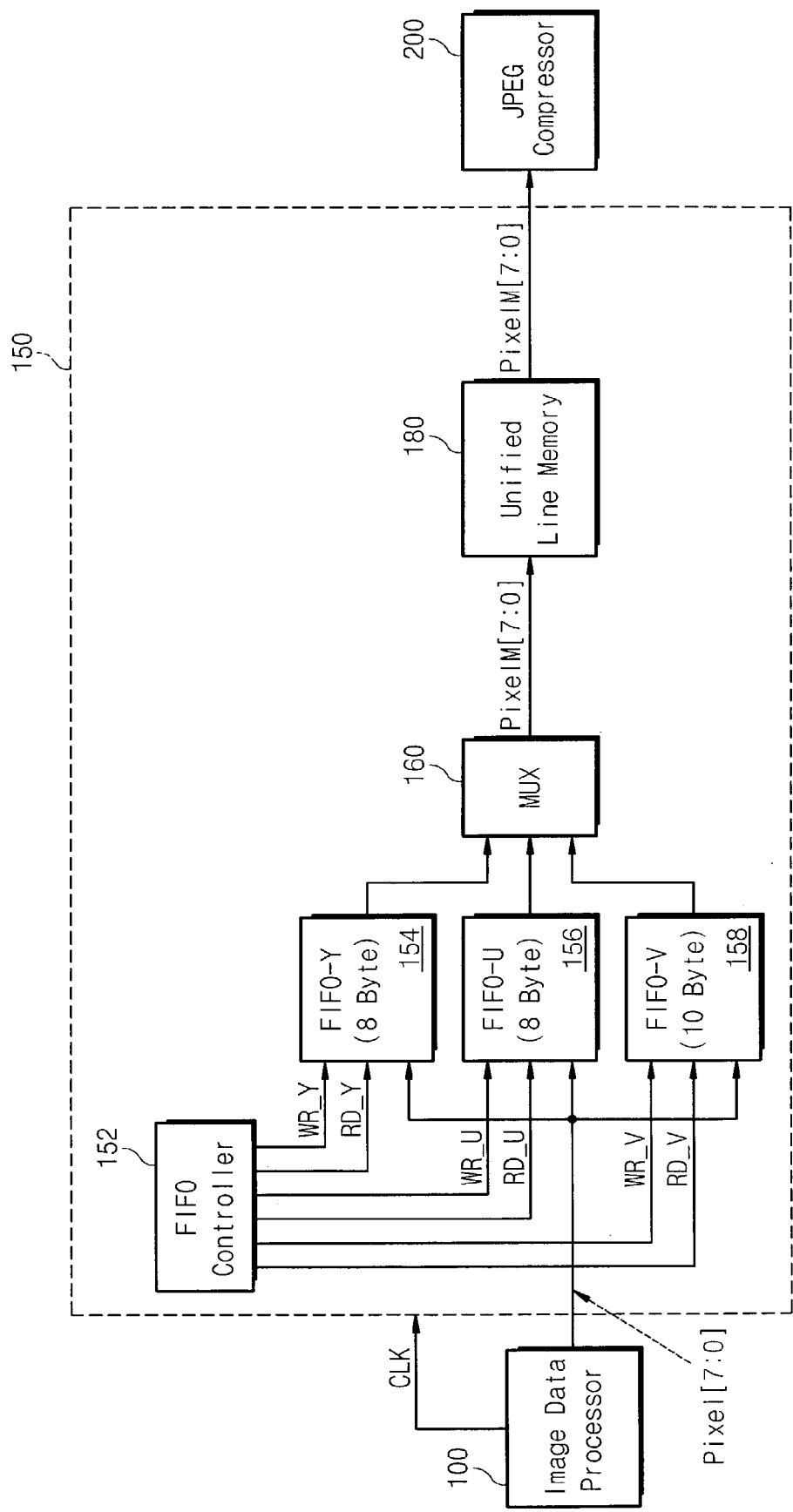

Fig. 9A

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |

Line Memory 8120

Fig. 9B

| | | | | | | | | | |
|---|---|---|---|---|---|---|---|---|---|
| 0 | 8 | 16 | 24 | 32 | 40 | 48 | 56 | 64 | 72 |
| 1 | 9 | 17 | 25 | 33 | 41 | 49 | 57 | 65 | 73 |
| 2 | 10 | 18 | 26 | 34 | 42 | 50 | 58 | 66 | 74 |
| 3 | 11 | 19 | 27 | 35 | 43 | 51 | 59 | 67 | 75 |
| 4 | 12 | 20 | 28 | 36 | 44 | 52 | 60 | 68 | 76 |
| 5 | 13 | 21 | 29 | 37 | 45 | 53 | 61 | 69 | 77 |
| 6 | 14 | 22 | 30 | 38 | 46 | 54 | 62 | 70 | 78 |
| 7 | 15 | 23 | 31 | 39 | 47 | 55 | 63 | 71 | 79 |

Line Memory 8120

Fig. 9C

| 0 | 64 | 49 | 34 | 19 | 4 | 68 | 53 | 38 | 23 |
|---|----|----|----|----|----|----|----|----|----|
| 8 | 72 | 57 | 42 | 27 | 12 | 76 | 61 | 46 | 31 |
| 16 | 1 | 65 | 50 | 35 | 20 | 5 | 69 | 54 | 39 |
| 24 | 9 | 73 | 58 | 43 | 28 | 13 | 77 | 62 | 47 |
| 32 | 17 | 2 | 66 | 51 | 36 | 21 | 6 | 70 | 55 |
| 40 | 25 | 10 | 74 | 59 | 44 | 29 | 14 | 78 | 63 |
| 48 | 33 | 18 | 3 | 67 | 52 | 37 | 22 | 7 | 71 |
| 56 | 41 | 26 | 11 | 75 | 60 | 45 | 30 | 15 | 79 |

Line Memory 8120

Fig. 9D

| 0 | 38 | 36 | 35 | 73 | 32 | 70 | 29 | 67 | 26 |
|---|---|---|---|---|---|---|---|---|---|
| 64 | 23 | 61 | 20 | 58 | 17 | 55 | 14 | 52 | 11 |
| 49 | 8 | 40 | 5 | 43 | 2 | 40 | 78 | 37 | 75 |
| 34 | 72 | 31 | 69 | 28 | 66 | 25 | 63 | 22 | 60 |
| 19 | 57 | 16 | 54 | 13 | 51 | 10 | 48 | 7 | 45 |
| 4 | 42 | 1 | 39 | 77 | 36 | 74 | 33 | 71 | 30 |
| 68 | 27 | 65 | 24 | 62 | 21 | 59 | 18 | 56 | 15 |
| 53 | 12 | 50 | 9 | 47 | 6 | 44 | 3 | 41 | 79 |

Line Memory 8120

Fig. 10A

Address Buffer 8142,8144

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |

Fig. 10B

Address Buffer 8142,8144

| 0 | 10 | 20 | 30 | 40 | 50 | 60 | 70 | 1 | 11 |
|---|---|---|---|---|---|---|---|---|---|
| 21 | 31 | 41 | 51 | 61 | 71 | 2 | 12 | 22 | 32 |
| 42 | 52 | 62 | 72 | 3 | 13 | 23 | 33 | 43 | 53 |
| 63 | 73 | 4 | 14 | 24 | 34 | 44 | 54 | 64 | 74 |
| 5 | 15 | 25 | 35 | 45 | 55 | 65 | 75 | 6 | 16 |
| 26 | 36 | 46 | 56 | 66 | 76 | 7 | 17 | 27 | 37 |
| 47 | 57 | 67 | 77 | 8 | 18 | 28 | 38 | 48 | 58 |
| 68 | 78 | 9 | 19 | 29 | 39 | 49 | 59 | 69 | 79 |

Fig. 10C

Address Buffer 8142,8144

| 0 | 21 | 42 | 63 | 5 | 26 | 47 | 68 | 10 | 31 |
|---|---|---|---|---|---|---|---|---|---|
| 52 | 73 | 15 | 36 | 57 | 78 | 20 | 41 | 62 | 4 |
| 25 | 46 | 67 | 9 | 30 | 51 | 72 | 14 | 35 | 56 |
| 77 | 19 | 40 | 61 | 3 | 24 | 45 | 66 | 8 | 29 |
| 50 | 71 | 13 | 34 | 55 | 76 | 18 | 39 | 60 | 2 |
| 23 | 44 | 65 | 7 | 28 | 49 | 70 | 12 | 33 | 54 |
| 75 | 17 | 38 | 59 | 1 | 22 | 43 | 64 | 6 | 27 |
| 48 | 69 | 11 | 32 | 53 | 74 | 16 | 37 | 58 | 79 |

Fig. 10D

Address Buffer 8142,8144

| 0 | 52 | 25 | 77 | 50 | 23 | 75 | 48 | 21 | 73 |
|---|---|---|---|---|---|---|---|---|---|
| 46 | 19 | 71 | 44 | 17 | 69 | 42 | 15 | 67 | 40 |
| 13 | 65 | 38 | 11 | 63 | 36 | 9 | 61 | 34 | 7 |
| 59 | 32 | 5 | 57 | 30 | 3 | 55 | 28 | 1 | 53 |
| 26 | 78 | 51 | 24 | 76 | 49 | 22 | 74 | 47 | 20 |
| 72 | 45 | 18 | 70 | 43 | 16 | 68 | 41 | 14 | 66 |
| 39 | 12 | 64 | 37 | 10 | 62 | 35 | 8 | 60 | 33 |
| 6 | 58 | 31 | 4 | 56 | 29 | 2 | 54 | 27 | 79 |

Fig. 15

| Read | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 16 | 17 | 18 | 19 |
| 1 | 80 | 81 | 82 | 83 | 84 | 85 | 86 | 87 | 88 | 89 | 90 | 91 | 92 | 93 | 94 | 95 | 96 | 97 | 98 | 99 |
| 2 | 160 | 161 | 162 | 163 | 164 | 165 | 166 | 167 | 168 | 169 | 170 | 171 | 172 | 173 | 174 | 175 | 176 | 177 | 178 | 179 |
| 3 | 240 | 241 | 242 | 243 | 244 | 245 | 246 | 247 | 248 | 249 | 250 | 251 | 252 | 253 | 254 | 255 | 256 | 257 | 258 | 259 |
| 4 | 320 | 321 | 322 | 323 | 324 | 325 | 326 | 327 | 328 | 329 | 330 | 331 | 332 | 333 | 334 | 335 | 336 | 337 | 338 | 339 |
| 5 | 400 | 401 | 402 | 403 | 404 | 405 | 406 | 407 | 408 | 409 | 410 | 411 | 412 | 413 | 414 | 415 | 416 | 417 | 418 | 419 |
| 6 | 480 | 481 | 482 | 483 | 484 | 485 | 486 | 487 | 488 | 489 | 490 | 491 | 492 | 493 | 494 | 495 | 496 | 497 | 498 | 499 |
| 7 | 560 | 561 | 562 | 563 | 564 | 565 | 566 | 567 | 568 | 569 | 570 | 571 | 572 | 573 | 574 | 575 | 576 | 577 | 578 | 579 |

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |

...

| 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|
| 40 | 41 | 42 | 43 | 44 | 45 | 46 | 47 | 48 | 49 | 50 | 51 | 52 | 53 | 54 | 55 | 56 | 57 | 58 | 59 |

...

| 60 | 61 | 62 | 63 | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|---|---|---|
| 60 | 61 | 62 | 63 | 64 | 65 | 66 | 67 | 68 | 69 | 70 | 71 | 72 | 73 | 74 | 75 | 76 | 77 | 78 | 79 |
| 140 | 141 | 142 | 143 | 144 | 145 | 146 | 147 | 148 | 149 | 150 | 151 | 152 | 153 | 154 | 155 | 156 | 157 | 158 | 159 |
| 220 | 161 | 162 | 163 | 164 | 165 | 166 | 167 | 168 | 169 | 170 | 171 | 172 | 173 | 174 | 175 | 176 | 177 | 178 | 179 |
| 300 | 301 | 302 | 303 | 304 | 305 | 306 | 307 | 308 | 309 | 310 | 311 | 312 | 313 | 314 | 315 | 316 | 317 | 318 | 319 |
| 380 | 381 | 382 | 383 | 384 | 385 | 386 | 387 | 388 | 389 | 390 | 391 | 392 | 393 | 394 | 395 | 396 | 397 | 398 | 399 |
| 460 | 461 | 462 | 463 | 464 | 465 | 466 | 467 | 468 | 469 | 470 | 471 | 472 | 473 | 474 | 475 | 476 | 477 | 478 | 479 |
| 540 | 541 | 542 | 543 | 544 | 545 | 546 | 547 | 548 | 549 | 550 | 551 | 552 | 553 | 554 | 555 | 556 | 557 | 558 | 559 |
| 620 | 621 | 622 | 623 | 624 | 625 | 626 | 627 | 628 | 629 | 630 | 631 | 632 | 633 | 634 | 635 | 636 | 637 | 638 | 639 |

Fig. 17

| Write | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 0 | 0 | 160 | 240 | 320 | 400 | 480 | 560 | 1 | 81 | 161 | 241 | 321 | 401 | 481 | 561 | 2 | 82 | 162 | 242 |
| 1 | 10 | 90 | 170 | 250 | 330 | 410 | 490 | 570 | 11 | 91 | 171 | 251 | 331 | 411 | 491 | 571 | 12 | 92 | 172 | 252 |
| 2 | 20 | 100 | 180 | 260 | 340 | 420 | 500 | 580 | 21 | 101 | 181 | 261 | 341 | 421 | 501 | 581 | 22 | 102 | 182 | 262 |
| 3 | 30 | 110 | 190 | 270 | 350 | 430 | 510 | 590 | 31 | 111 | 191 | 271 | 351 | 431 | 511 | 591 | 32 | 112 | 192 | 272 |
| 4 | 40 | 120 | 200 | 280 | 360 | 440 | 520 | 600 | 41 | 121 | 201 | 281 | 361 | 441 | 521 | 601 | 42 | 122 | 202 | 282 |
| 5 | 50 | 130 | 210 | 290 | 370 | 450 | 530 | 610 | 51 | 131 | 211 | 291 | 371 | 451 | 531 | 611 | 52 | 132 | 212 | 292 |
| 6 | 60 | 140 | 220 | 300 | 380 | 460 | 540 | 620 | 61 | 141 | 221 | 301 | 381 | 461 | 541 | 621 | 62 | 142 | 222 | 302 |
| 7 | 70 | 150 | 230 | 310 | 390 | 470 | 550 | 630 | 71 | 151 | 231 | 311 | 391 | 471 | 551 | 631 | 72 | 152 | 232 | 312 |

| | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| | 322 | 402 | 482 | 562 | 3 | 83 | 163 | 243 | 323 | 403 | 483 | 563 | 4 | 84 | 164 | 244 | 324 | 404 | 484 | 564 |

...

| | 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|---|
| | 5 | 85 | 165 | 245 | 325 | 405 | 485 | 565 | 6 | 86 | 166 | 246 | 326 | 406 | 486 | 566 | 7 | 87 | 167 | 247 |

...

| | 60 | 61 | 62 | 63 | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|---|---|---|---|
| | 327 | 407 | 487 | 567 | 8 | 88 | 168 | 248 | 328 | 408 | 488 | 568 | 9 | 89 | 169 | 249 | 329 | 409 | 489 | 569 |
| | 337 | 417 | 497 | 577 | 18 | 98 | 178 | 258 | 338 | 418 | 498 | 578 | 19 | 99 | 179 | 259 | 339 | 419 | 499 | 579 |
| | 347 | 427 | 507 | 587 | 28 | 108 | 188 | 268 | 348 | 428 | 508 | 588 | 29 | 109 | 189 | 269 | 349 | 429 | 509 | 589 |
| | 357 | 437 | 517 | 597 | 38 | 118 | 198 | 278 | 358 | 438 | 518 | 598 | 39 | 119 | 199 | 279 | 359 | 439 | 519 | 599 |
| | 367 | 447 | 527 | 607 | 48 | 128 | 208 | 288 | 368 | 448 | 528 | 608 | 49 | 129 | 209 | 289 | 369 | 449 | 529 | 609 |
| | 377 | 457 | 537 | 617 | 58 | 138 | 218 | 298 | 378 | 458 | 538 | 618 | 59 | 139 | 219 | 299 | 379 | 459 | 539 | 619 |
| | 387 | 467 | 547 | 627 | 68 | 148 | 228 | 308 | 388 | 468 | 548 | 628 | 69 | 149 | 229 | 309 | 389 | 469 | 549 | 629 |
| | 397 | 477 | 557 | 637 | 78 | 158 | 238 | 318 | 398 | 478 | 558 | 638 | 79 | 159 | 239 | 319 | 399 | 479 | 559 | 639 |

Fig. 18

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 0 | 10 | 20 | 30 | 40 | 50 | 60 | 70 | 80 | 90 | 100 | 110 | 120 | 130 | 140 | 150 | 160 | 170 | 180 | 190 |
| 1 | 161 | 171 | 181 | 191 | 201 | 211 | 221 | 231 | 241 | 251 | 261 | 271 | 281 | 291 | 301 | 311 | 321 | 331 | 341 | 351 |
| 2 | 322 | 332 | 342 | 352 | 362 | 372 | 382 | 392 | 402 | 412 | 422 | 432 | 442 | 452 | 462 | 472 | 482 | 492 | 502 | 512 |
| 3 | 483 | 493 | 503 | 513 | 523 | 533 | 543 | 553 | 563 | 573 | 583 | 593 | 603 | 613 | 623 | 633 | 4 | 14 | 24 | 34 |
| 4 | 5 | 15 | 25 | 35 | 45 | 55 | 65 | 75 | 85 | 95 | 105 | 115 | 125 | 135 | 145 | 155 | 165 | 175 | 185 | 195 |
| 5 | 166 | 176 | 186 | 196 | 206 | 216 | 226 | 236 | 246 | 256 | 266 | 276 | 286 | 296 | 306 | 316 | 326 | 336 | 346 | 356 |
| 6 | 327 | 337 | 347 | 357 | 367 | 377 | 387 | 397 | 407 | 417 | 427 | 437 | 447 | 457 | 467 | 477 | 487 | 497 | 507 | 517 |
| 7 | 488 | 498 | 508 | 518 | 528 | 538 | 548 | 558 | 568 | 578 | 588 | 598 | 608 | 618 | 628 | 638 | 9 | 19 | 29 | 39 |

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| 200 | 210 | 220 | 230 | 240 | 250 | 260 | 270 | 280 | 290 | 300 | 310 | 320 | 330 | 340 | 350 | 360 | 370 | 380 | 390 |

...

| 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|
| 400 | 410 | 420 | 430 | 440 | 450 | 460 | 470 | 480 | 490 | 500 | 510 | 520 | 530 | 540 | 550 | 560 | 570 | 580 | 590 |

...

| | 60 | 61 | 62 | 63 | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|---|---|---|---|
| | 600 | 610 | 620 | 630 | 1 | 11 | 21 | 31 | 41 | 51 | 61 | 71 | 81 | 91 | 101 | 111 | 121 | 131 | 141 | 151 |
| | 122 | 132 | 142 | 152 | 162 | 172 | 182 | 192 | 202 | 212 | 222 | 232 | 242 | 252 | 262 | 272 | 282 | 292 | 302 | 312 |
| | 283 | 293 | 303 | 313 | 323 | 333 | 343 | 353 | 363 | 373 | 383 | 393 | 403 | 413 | 423 | 433 | 443 | 453 | 463 | 473 |
| | 444 | 454 | 464 | 474 | 484 | 494 | 504 | 514 | 524 | 534 | 544 | 554 | 564 | 574 | 584 | 594 | 604 | 614 | 624 | 634 |
| | 605 | 615 | 625 | 635 | 6 | 16 | 26 | 36 | 46 | 56 | 66 | 76 | 86 | 96 | 106 | 116 | 126 | 136 | 146 | 156 |
| | 127 | 137 | 147 | 157 | 167 | 177 | 187 | 197 | 207 | 217 | 227 | 237 | 247 | 257 | 267 | 277 | 287 | 297 | 307 | 317 |
| | 288 | 298 | 308 | 318 | 328 | 338 | 348 | 358 | 368 | 378 | 388 | 398 | 408 | 418 | 428 | 438 | 448 | 458 | 468 | 478 |
| | 449 | 459 | 469 | 479 | 489 | 499 | 509 | 519 | 529 | 539 | 549 | 559 | 569 | 579 | 589 | 599 | 609 | 619 | 629 | 639 |

IMAGE PROCESSING APPARATUS AND METHOD FOR CONVERSION BETWEEN RASTER AND BLOCK FORMATS

RELATED APPLICATION

This application claims priority from Korean Patent Application No. 2002-42603, filed on Jul. 19 2002, and Korean Patent Application No. 2002-44991 filed on Jul. 30, 2002, the contents of both of which are herein incorporated by reference in their entirety.

BACKGROUND OF THE INVENTION

1. Field of the Invention

The present invention relates to an image processing apparatus and method and, more specifically, to an image processing apparatus and method for converting image data between a raster scan order and a block scan order.

2. Description of the Related Art

JPEG (Joint Photographic Experts Group) is a compression standard for transmitting still image data such as photographs. JPEG is designed for compressing full-color or gray-scale images, and works well for photographs or art. While another format, GIF (Graphics Interchange Format) allows transmission of color images of 256 colors, JPEG is capable of processing color images in approximately 16 million colors and is more suited to high-resolution display devices. Another advantage of JPEG is that users can control the quality of an image and the size of an image file. For example, when a large-sized image file is compressed into a considerably smaller-sized file, the quality of images may be degraded. However, JPEG compression techniques are capable of compressing images reliably so that compressed images are not lower in quality.

Therefore, JPEG has been widely used for the compression of still image data in such devices as digital still cameras. As is popularly known, JPEG employs a discrete cosine transform (DCT) for compression of data. DCT processes data in a block format of, for example, 8*8 pixels. However, an image data processor of a digital still camera which precedes the DCT processing outputs image data in a raster format (i.e., in a raster scan order, which is from left to right and from top to bottom throughout the image data). FIG. 1A illustrates image data in a raster scan order as output by an image data processor of a digital still camera.

To use JPEG image data stored in a line buffer in a raster format (which is output from the image data processor of the camera as illustrated in FIG. 1A), this data should be read in a block format as shown in FIG. 1B before being supplied to a JPEG compressor. FIG. 1B illustrates image data in a block order format to be input to the JPEG compressor. The conversion from raster scan order to block scan order requires line memories that are capable of storing image data of at least 8 lines. Also, because the image data includes luminance component Y and chrominance components U and V, each color component requires a separate line memory.

FIG. 2 illustrates a conventional line memory system operating under the conventional VGA (Variable Graphics Array) standard for producing an 8*8 block for JPEG compression. An image data processor 10 generates the luminance component Y and chrominance components U and V of the image data in raster format (for example, a 4:2:2 raster format). The image data components Y, U, and V, which are generated from the image data processor 10, are stored in cell arrays of corresponding line memories 12, 14, and 16 by a memory controller. The image data components Y, U, and V, which are stored in the respective line memories 12, 14, and 16 by the image data processor 10, are read in sequences of 8*8 block units to be transferred to a JPEG compressor 20 through a multiplexer 18.

Each line memory 12, 14, and 16 may include additional peripheral circuits for driving the cell arrays of the corresponding line memories 12, 14, and 16. One such example is an address decoder. Thus, there is a great deal of hardware duplication when using multiple line memories. This causes an increase in design costs. Additionally, line memories have become larger and when the line memories are embedded in chips in order to operate a line memory system with low power, the chips also must increase in size. Finally, as the amount of image data increases in size, so must the line memories. As a result, the foregoing problems will grow more serious.

As discussed above, JPEG employs DCT for compression of data and DCT processes data on a block unit of 8*8 pixels and an image data processor of a camera generates image data (in a raster scan order, i.e., from left to right and from top to bottom throughout an image data). Accordingly, conversion of image data of a raster scan order into a block scan order requires a line memory that is capable of storing image data of at least 8 lines. While an image block of 8*8 pixels is produced from the line memory in which the image data of 8 lines are stored, the image data processor of the camera generates new image data. Therefore, a pair of line memory of 8 lines (one to read and one to write) is required to continuously process image data. In other words, while image data is written into one line memory in raster scan order, image data stored in the other line memory is read out in an 8*8 block. Because image data is divided into a luminance component Y and chrominance components U and V, a pair of line memories is needed for each image data component Y, U, V.

FIG. 3A is a schematic block diagram of another conventional VGA-standard image processing apparatus, and illustrates a pairwise line memory system for the luminance component Y only (a pairwise line memory system would also be necessary for each of the chrominance components U and V). Luminance components Y of 8 lines are output from the image data processor 10 and stored linearly into a first line memory Y1 (121). Second luminance components Y of 8 lines are stored linearly into a second line memory Y2 (122), and at the same time a reading operation is performed on the first line memory Y1 on an 8*8 block unit. To accomplish this, switch 181 of MUX 18 is closed and the 8*8 image data block read out from the second line memory Y1 (121) is transferred to the JPEG compressor 20.

FIG. 3B illustrates the pixel order from the image data processor 10 and FIG. 3C illustrates color components Y, U, V stored in their respective line memories 12, 14, and 16.

Write and read addresses of the first and second line memories 121 and 122 are generated by an address generator 24. For a 640×480 VGA image, as illustrated in FIG. 3D, the write address wr_addrline for the line memories 121 and 122 increases from 0 to 640*8-1. The read address rd_addrline for the line memories 121 and 122 for reading out image data in a block unit is set according to Equation 1 below.

```
for(i=0;i<640/8;i++){
    for( vv=0;vv<8; vv++){
        for( hh=0; hh<8; hh++){
            addr= vv*640+(i*8+ hh)=(vv*80+i)*8+ hh
        }
    }
}
``` where "640" represents the number of horizontal pixels in the VGA standard, "i" represents the block order, "vv" is a variable represents a vertical pixel (line) of one block, "hh" is a variable representing a horizontal pixel of one block, and (vv*80+i) is an anchor address which holds its value for 8 cycles.

When third luminance components Y of 8 lines are stored into the first line memory Y1 (121) referring to the write address wr_addrline, the switch 181 of MUX 18 is opened and the switch 182 of MUX 18 is closed. A reading operation is performed on the second line memory_Y2 (122) on a block unit referring to the read address, and the read block is transferred to the JPEG compressor 20.

As illustrated and described, the foregoing conventional image processing method uses at least one line memory for each color component and possibly a pair of line memories for each color component. For example, in case of VGA standard, a pair of line memories of 640*8 bytes are used for the luminance component Y, and a pair of line memories of 320*8 bytes for each of the chrominance components U, V. Accordingly, in the event that the line memories are embedded in a chip in order to operate a system with low power, the chip may be increased in size. Still further, as the size of image data increases, the foregoing problem can become more serious.

SUMMARY OF THE INVENTION

In an exemplary embodiment, the present invention provides an image processing apparatus with a smaller line buffer memory for converting image data between a raster format and a block format.

In an exemplary embodiment, the present invention provides an image processing method for converting image data between a raster format and a block format, which is performed with a smaller line buffer memory.

In an exemplary embodiment, the present invention provides an image processing apparatus having a reduced number of line memories. For example, each image data component or color component is stored in a single unified line memory. In such an exemplary embodiment, since the number of extra circuits, such as an address decoder embedded in the memory is reduced, the line memory can be smaller in size.

In an exemplary embodiment, the present invention employs FIFO (First In First Out) small capacity memories for each color components so as to read image data in sequence of a block unit from a unified line memory. The image data components are read out from each FIFO memory, and stored in the unified line memory such that it is easy to read the image data in sequence of a block unit from the unified line memory.

In an exemplary embodiment, the present invention is directed to image processing apparatus for converting image data between a raster format and a block format, including an image data processor for providing the image data including a luminance component and at least one chrominance component in the raster format; at least two FIFO memories for storing corresponding image data components; a multiplexer for multiplexing the image data components from the at least two FIFO memories; a unified line buffer memory for storing outputs of the multiplexer linearly; and an image compressor for receiving the image data components in block format in sequence from the unified line buffer memory and compressing the received image data components.

In another exemplary embodiment of the present invention, the luminance component is the luminance component Y, and the chrominance components are the chrominance components U and V.

In another exemplary embodiment of the present invention, the multiplexing means multiplexes 2*h luminance components and 2*h chrominance components in this order to make it easy to read in sequence of a block unit from the unified line memory, where h stands for a horizontal resolution of one block format, or the number of pixels in horizontal direction. In the example of the JPEG standard, the horizontal resolution of one block format or the number of horizontal pixels is 8.

In another exemplary embodiment, the image data processor provides image data in the order of the luminance component Y, the chrominance component U, the luminance component Y, and the chrominance component V, i.e., YUYVYUYV□. The multiplexing means multiplexes in the order of 2*h numbered luminance components Y, h numbered chrominance components U, and h numbered chrominance components V, where h is a horizontal resolution of one block format. The JPEG compressor receives the image data in block format in the order of block Y, block Y, block U, and block V. That is, the JPEG compressor receives the image data in the order of Y, Y, U, V, Y, Y, U, V . . . and compresses the received image data.

In an exemplary embodiment, the unified line buffer memory has a size of H*v*2 bytes, where H is a horizontal resolution of image data and a multiple of v that is the vertical resolution of one block format. In the example of the JPEG standard, h equals 8 and H equals 640 in the VGA standard.

In an exemplary embodiment, the present invention is directed to an image processing apparatus comprising an image data processor, which provides image data of horizontal resolution H including a luminance of Y, U, Y, V . . . , FIFO memories for storing corresponding components Y, U, and V, a multiplexer for multiplexing 16 components Y, 8 components U, and 8 components V, a unified line buffer memory for storing output of the multiplexing means linearly, and an image processor receiving two blocks of luminance components Y, one block of chrominance component U, and one block of chrominance component V in this order and compressing the received image data components on a block unit.

In an exemplary embodiment, each block comprises 8*8 color components, and the unified line buffer memory has a size of H*8*2 bytes. That is, if a frame of image data can be divided into N blocks, the unified line buffer memory of the present invention has a capacity to store N blocks of components Y, N/2 blocks of components U, and N/2 blocks of components V.

According to an exemplary embodiment of the present invention, the image processing apparatus uses only one unified line buffer memory. Thus, since each extra circuit like an address decoder, which is embedded in the line buffer memory, is not required more than one, a size of the memory can be reduced. In addition, image data are stored in the unified line buffer memory by using a FIFO memory so as to make it easy to read on a block unit, i.e., in the order of 16 components Y, 8 components U, and 8 components V.

In an exemplary embodiment, the present invention provides an image processing method wherein image data including different color components in a raster format are stored into a single unified line buffer memory. Each color component is stored into respective FIFO memory of small capacity and multiplexed into the single unified line buffer memory so as to be easily read on a block unit. Thereafter, each color component is stored in the unified line buffer memory.

In an exemplary embodiment, the present invention provides an image processing method comprising providing image data, which include a luminance component and a pair of chrominance components, in a raster format, storing the image data into corresponding FIFO memories, storing the image data stored in the FIFO memories into a single unified line buffer memory, and outputting the image data in sequence of a block format.

In another exemplary embodiment, the image data are stored in the unified line buffer memory in the order of 16 luminance components, first 8 chrominance components, and second 8 chrominance component. The image data stored in the unified line buffer memory are outputted in the order of two blocks of luminance components, one block of first chrominance component, and one block of second chrominance component in sequence. Preferably, the luminance component is Y, the first chrominance component is U, and the second chrominance component is V.

In an exemplary embodiment, the present invention provides an image processing method, storing the image data stored in the FIFO memories into single line buffer memory comprises reading the image data from the FIFO memories in the order of the 16 luminance components, the first 8 chrominance components, and the second 8 chrominance components, then writing the image data linearly in the unified line buffer memory to the reading order. In an exemplary embodiment, when the image data are read from the FIFO memory and written in the unified line buffer memory, new image data are stored in the FIFO memory.

In an exemplary embodiment, reading an initial luminance component from the FIFO memory starts after 8 chrominance components Y are stored into the FIFO memory.

In another exemplary embodiment of the present invention, the reading an initial luminance component from the FIFO memory can start after 16 chrominance components Y are stored into the FIFO memory.

In an exemplary embodiment, the present invention is directed to an image processing apparatus for converting image data between raster scan order and block scan order including an image data processor for providing image data including a horizontal resolution H and a vertical resolution V in a raster scan order; a single line memory for storing image data of v lines; an address generator for generating a common read/write address for the single line buffer memory; and an image compressor for receiving image data of a v*h block unit from the single line memory and compressing the received image data, wherein when the image data of v lines are read out from the single line memory in a block scan order referring to the common read/write address, next image data of v lines are written into the single line memory with reference to the same common read/write address.

The common read/write address generator may comprises a pair of address buffers for storing an anchor address, and an address controller for synthesizing the common read/write address based on the anchor address. The anchor address has values of 0~H*v/h−1, which increments on every h pixels of v*H pixels of image data of v lines. An anchor address is stored into one address buffer in a block scan order with respect to an order of an anchor address stored in the other address buffer.

The anchor address stored in the one address buffer may be f[n], where f[n] is an anchor address stored in an nth address of the other address buffer and n equals (H/h)*vv+i, wherein "i" represents a block order of image data of v lines and increments from 0 to (H/h)−1. "vv" stands for the number of lines of a block and increments from 0 to v−1 with respect to each i. That is, anchor addresses stored in addresses 0, H/h, H/h*2, H/h*3, . . . , H/h*(v−1), 1, H/h+1, H/h*2+1, H/h*3+1, . . . , H/h*(v−1)+1, . . . of the other address buffer are stored in sequence in addresses 0, 1, 2, 3, . . . , v−1, v, v+1, v+2, v+3, v+7, . . . of the one address buffer.

In another exemplary embodiment, an address controller provides a read address for reading out the anchor address from the one address buffer as well as a write address for writing the anchor addresses read out from the one address buffer into the other address buffer. The address controller synthesize the common read/write address by multiplying the anchor address read out from the one address buffer by h and adds hh which increments 0~h−1.

In another exemplary embodiment, the address controller provides the read address n=(H/h)*v+i for the one address buffer, and the write address incrementing from 0 to H−1 for writing the anchor address read out by the read address n=(H/h)*v+i into the other address buffer.

When the next image data of v lines are read out from the single line memory and next following image data of v lines are written into the single line memory, the address controller provides the read address n=(H/h)*v+i so as to read out the anchor address from the one address buffer, and provides the write address incrementing from 0 to H−1 so as to write the anchor address read out from the one address buffer into the other address buffer.

In an exemplary embodiment, the present invention is directed to an address generator for converting image data between a raster scan order having a resolution V*H and a block scan order of v*h pixels by using one line memory, which comprises a pair of address buffers and an address controller. Each of a pair of the address buffers converts between read and write operation modes having complementary operation mode to the other, and stores the anchor address. The address controller provides a read address for the address buffers for the read operation mode as well as a write address for the address buffers for the write operation mode, and synthesizes common read/write address for to the line memory based on the anchor address read out from the address buffers.

The anchor address has values of 0~v*H/h−1, which increment on every h pixels of v*H pixels written into the line memory. The anchor address read out from one address buffer referring to the read address is written into the other address buffer referring to the write address. At this time, the read address is given (H/h)*v+i to correspond to the block scan order (here, "i" stands for the block order of the image data of v lines, and increments from 0 to (H/h)−1, and "v" stands for the number of lines of one block and increments from 0 to v−1 with respect to each i ), and the write address is given incrementing 0 to v*H/h−1.

The common read/write address is synthesized by multiplying the anchor address read out by the read address by h and adds hh, where hh increments from 0 to h−1 with respect to each "vv".

In another exemplary embodiment of the present invention, h equals 8 and v equals 8.

Preferably, conversion between the read and write operation modes is made when data of the address buffer are completely renewed.

In an exemplary embodiment, the present invention is directed to an image processing method for converting image data between a raster scan order and a v*h block scan order by using a single line memory, comprising: providing first and second address buffers; generating read address and write address for the address buffers; storing image data of v lines into the single line memory and storing an anchor address generated on every h pixels into the first address buffer with reference to the write address; reading out the anchor address stored in the first address buffer by referring to the read address and storing the read anchor address into the second address buffer referring to the write address; generating common read/write address for the line memory based on the anchor address read out by the read address; reading the image data of v lines referring to the common read/write address out from and at the same time writing a new image data of v lines into the line memory; and repeating the reading out the anchor addresses, generating the common read/write addresses, and reading the image data of v lines until all image data are completely processed, wherein every time the reading out the anchor addresses, generating common read/write addresses, and reading the image data of v lines are repeated, the address buffers are alternately referred to by the read and write addresses, the write address increments in sequence, and the read address corresponds to the block scan order.

In the image processing method, if image data, which will be processed, have a resolution of V*H, the anchor address has values of 0~v*H/h−1, the write address increments on every h pixels from 0 to v*H/h−1, and the read address is H/h*vv+i (here, "i" is a variable standing for a block order of v*H image data written into the single line memory and increments from 0 to H/h−1. "vv" is a variable standing for an order of lines of a block and increments from 0 to v−1 with respect to each i) and maintains a value on every h pixels. The common read/write address is f[(H/h*vv+i)]*h+ hh (where "hh" is a variable standing for an order of horizontal pixels of a block and increments from 0 to h−1 with respect to each i and f[(H/h*vv+i)] is the anchor address read out by the read address H/h*vv+i from the address buffer).

In another exemplary embodiment of the present invention, v equals 8 and h equals 8.

In an exemplary embodiment, the present invention is directed to An image processing method for converting image data between a raster scan order having a resolution V*H and a 8*8 block scan order, comprising: writing image data of 8*H pixels linearly into a single line memory, and writing an anchor address maintaining a fixed value on every 8 pixels, into a first address buffer referring to a write; reading the anchor address stored in the first address buffer with reference to a read address; storing the anchor address read out from the first address buffer into a second address buffer with reference to the write address, and synthesizing a common read/write address based on the read anchor address; reading out the image data of 8*H pixels from the single line memory referring to the common read/write address, and at the same time writing image data of next 8*H pixels into the single line memory referring to the common read/write address; repeating the reading the anchor address, storing the anchor address, and reading out the image data of 8*H pixels until the image data of V*H pixels are completely processed, wherein every time the reading the anchor address, storing the anchor address, and reading out the image data of 8*H pixels are repeated, the address buffers are alternately referred to by the read and write addresses, the write address increments in sequence from 0 to H−1, and the reading address satisfying (H/8)*vv+i where "i" represents an order of a block of image data of 8 lines and increments from 0 to (H/8)−1, "vv" represents the number of lines of a block and increments from 0 to 7 with respect to each i, and the common read/writing address is synthesized by multiplying the anchor address read out by the read address by 8 and adding hh incrementing 0~7.

In another exemplary embodiment of the present invention, v equals 8 and h equals 8.

In an exemplary embodiment, the present invention is directed to image processing apparatus and method for converting image data between a raster scan order and a block scan order, which employs a reduced number of line memories. In other words, the present invention uses a single line memory for each color components and a pair of address buffers in order to perform a read operation of a raster scan order and a write operation of a block scan order in succession in the single line memory. Each address buffer stores a value (hereinafter referred to as an "anchor address") obtained by dividing a first address of each line (hereinafter referred to as a "segment") of a block by 8 when first 8 lines of image data are stored into line memory from address 0 to last address in sequence. Each segment includes 8 pixels, and eight segments constitute one block. For instance, in case of luminance components of VGA standard using JPEG, the anchor address is 0, 1, 2, 3, . . . , 638, 639. One address buffer stores the anchor address in the different order from the order of an anchor address stored in the other address buffer. Namely, the one address buffer stores anchor address in order corresponding block scan order (for example, in the order of 0, 80, 160, . . . , 560, 1, 81, . . . , 561, 2, 82, 162, . . . , 78, . . . , 638, 79, 159, 239, . . . , 559, 639) with respect to the order of the anchor address (0, 1, 2, 3, . . . , 638, 639) stored in the other address buffer. When image data of initial 8 lines are written (stored) linearly into the single line memory, the anchor address (0, 1, 2, 3, . . . , 638, 639) incrementing on every 8 pixels are written into the first address buffer at address 0~639. The common read/write address is generated by the address controller so as to generate 8*8 image blocks, i.e., to read out image data of first 8 lines from the single line memory on an 8*8 block unit. The address controller reads out the anchor address (0, 1, 2, 3, . . . , 638, 639) stored in the first address buffer in the block scan order (i.e., read out the anchor address at address 0, 80, 160, . . . , 560, 1, 81, . . . , 561, 2, 82, 162, . . . , 78, . . . , 638, 79, 159, 239, . . . , 559, 639) and stores the read anchor address in a second address buffer at address 0~639. The common read/write addresses are synthesized by multiplying the read anchor address of the block scan order by 8 and adding 0~7 in sequence. The first 8 lines are read out in the block scan order referring to the common read/write address from the single line memory and at the same time second 8 lines are written into the single line with reference to the common read/write address. The read address for reading out the anchor address from the first address buffer is (640/8)*vv+i and, here, "i" represents the block order of image data and increments from 0 to 79. "vv" increments from 0 to 7 with respect to each "i". That is, in the first address buffer, the anchor addresses stored in address 0, 80, 160, . . . ,1, 81, . . . are read out in this order.

A common address for reading out the second 8 lines from and writing third 8 lines into the single line memory is synthesized based on the anchor address (0, 80, 160, . . . , 560, 1, 81, . . . , 561, 2, 82, 162, . . . , 78, . . . , 638, 79, 159, 239, . . . , 559, 639) stored in the address numbers 0~639 of the second address buffer. The read address of the second buffer address is the same as the read address of the first buffer address. That is, the anchor addresses stored in the address 0, 80, 160, . . . , 560, 1, 81, . . . , 561, 2, 82, 162, . . . , 78, . . . , 638, 79, 159, 239, . . . , 559, 639 of the second address buffer are read out and written into the first address buffer in address 0~639. Similarly, the read anchor addresses from the second address buffer are multiplied by 8 and added by 0~7 in sequence, thereby synthesizing the common read/write address.

The foregoing steps are repeated until a frame of image data (in case of JPEG, the frame of image data is 680*480) is completely processed. According to the present invention, the read address of the address buffer is always generated according to the fixed pattern, i.e., (640/8)*vv+i and the write address always increments from 0 to 639. When 8 lines are completely processed, the anchor address of the address buffer is renewed and replaced by an anchor address of a new order. The write address of the address buffer can be easily embodied by using a counter and likewise the read address having the fixed pattern can be easily embodied using a counter, a multiplier, and an adder.

BRIEF DESCRIPTION OF THE DRAWINGS

FIG. 1A illustrates image data being written into a line memory in a raster scan order;

FIG. 1B illustrates image data stored in the line memory in the raster scan order being read out in a block scan order;

FIG. 2 is a schematic block diagram of a line buffer system of a conventional image processing apparatus, which uses a separate line memory for each color component;

FIG. 3A is a schematic block diagram of a line buffer system of a conventional image processing apparatus using a pair of line memories for each color component.

FIG. 4 is a schematic block diagram of a line buffer system of an image processing apparatus according to an exemplary embodiment of the present invention, in which all color components are stored into a single unified line buffer memory;

FIGS. 9A to 9D are diagrams for illustrating that image data of 8*80 pixels are stored in the single line memory according to an exemplary embodiment of the present invention;

FIGS. 10A to 10D are diagrams for illustrating that an anchor address is stored in an address buffer according to an exemplary embodiment of the present invention;

FIG. 15 illustrates the contents of the address buffer 1142 after initialization according to an exemplary embodiment of the present invention;

FIG. 17 illustrates the contents of the address buffer 1144 after writing according to an exemplary embodiment of the present invention;

FIG. 18 shows the contents of the next 8 pixel rows of address buffer 1142 of FIG. 16 according to an exemplary embodiment of the present invention;

DETAILED DESCRIPTION OF EXEMPLARY EMBODIMENTS

Figure 3B:
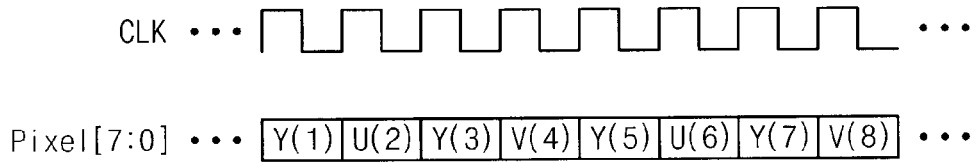
FIG. 3B illustrates the pixel order from the image data processor of a digital still camera.
Figure 3C:
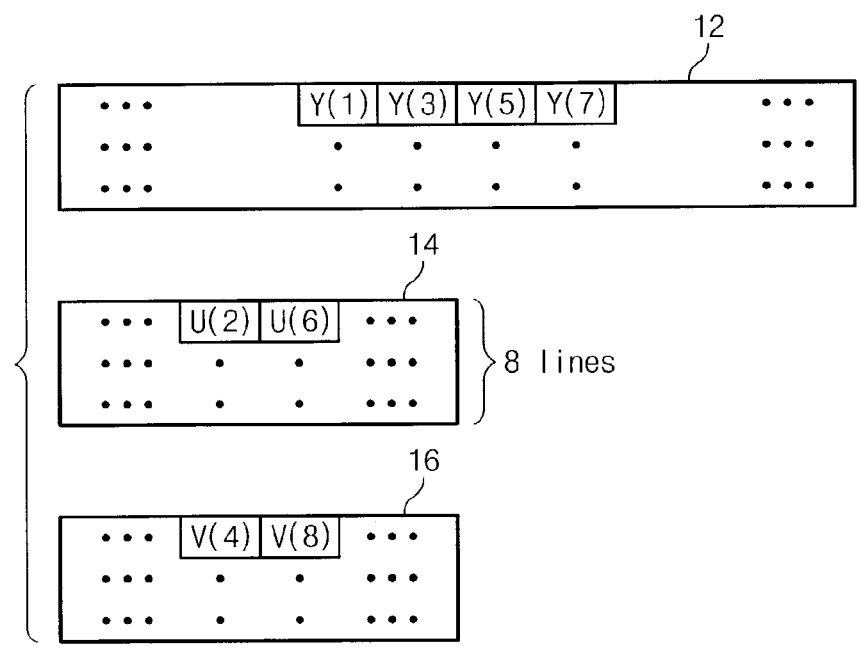
FIG. 3C illustrates color components stored in their respective line memories.
Figure 3D:
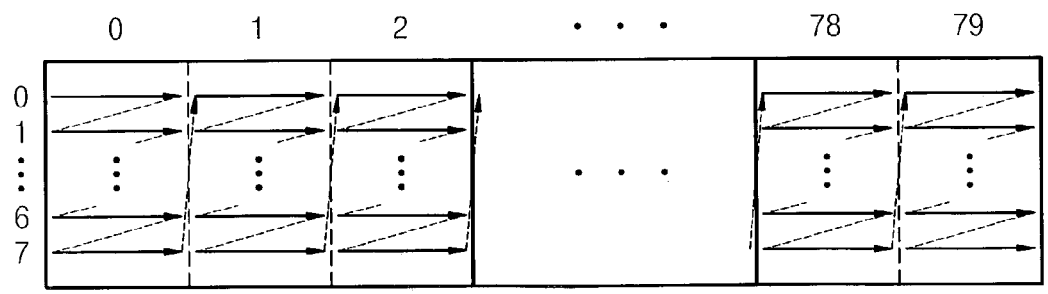
FIG. 3D illustrates a 640×480 VGA luminance image.

The present invention will now be described more fully hereinafter with reference to the accompanying drawings, in which preferred embodiments of the invention are shown. Below, "H" represents a horizontal resolution of image data, or the number of pixels in horizontal direction, and "h" represents a horizontal resolution of a block, or the number of pixels in horizontal direction of a block. In case of a VGA standard, a horizontal resolution "H" is 640 and a vertical resolution "V" is 480.

FIG. 4 is a schematic block diagram of an image processing apparatus including a single unified line memory system according to an exemplary embodiment of the present invention. The image processing apparatus includes an image data processor 100 for providing image data in raster format, a JPEG compressor 200 for compressing image data in a sequence of block units, e.g., in sequence of a 8*8 block units, and a line buffer system 150 for converting image data between a raster format and a block format between the image data processor 100 and the JPEG compressor 200. The image data processor 100 generates digital data of color components including luminance components and chrominance components. For example, the luminance component is Y and the chrominance components are U and V. The image data processor 100 may generate the luminance component Y and the chrominance components U and V in the 4:2:2 format, the 4:4:4 format, or in any other format known to are of ordinary skill in the art. In case of the 4:2:2 format, the image data processor 100 generates the luminance and chrominance component in the order of Y, U, Y, V, Y, U, Y, V . . in a raster format. The following discussion assumes that the image data processor 100 generates the luminance components and chrominance components in the 4:2:2 format, but this need not be the case.

According to the line buffer system 150 of exemplary embodiments of the present invention, the image data comprising the luminance and chrominance components, which are generated from the image data processor 100, are stored in a unified line buffer memory 180. The unified line buffer memory 180 may store image data of at least 8 lines for conversion of a scanning format (conversion between a raster format and the 8*8 block format). Since the image data processor 100 generates image data in the 4:2:2 format, the unified line buffer memory 180 has a size of at least H*8*2 bytes. Unlike a conventional apparatus using a separate line buffer for each color component, the present invention in exemplary embodiments, provides an image processing apparatus with a single unified line buffer memory. Therefore, peripheral circuits for driving a memory cell array included in each line memory for each color component in conventional line memory system are unified into one peripheral circuit and, similarly, address decoders for reading a block unit are unified into one address decoder. As a result, a size of the line buffer memory 180 can be reduced over conventional image processing apparatus. FIFO memories 154, 156, and 158 of small capacity are used for each color component in order to store image data into the unified line buffer memory 180 in a format for the JPEG compressor 200. Each of the FIFO memories 154, 156, and 158 divides the image data generated from the image data processor 100 into color components and transfers the divided image data to the unified line buffer memory 180 through a multiplexer 160, so that each color component can be transferred to the unified line buffer memory 180 in a format for the JPEG compressor 200.

More specifically, image data Y0U0Y1V0Y2U1Y3 V1 . . . output from the image data processor 100 is stored in the FIFO memories 154, 156, and 158 by color component under the control of a FIFO controller 152. That is, the luminance components Y are stored in the FIFO_Y memory 154 in the order of Y0Y1Y2Y3 . . . , the chrominance components U are stored in the FIFO_U memory 156 in the order of U0U1 . . . , and the chrominance components V are stored in the FIFO_V memory 158 in the order of V0V1 . . .

The color components stored in the FIFO memories 154, 156, and 158 are stored (and also read out and written) in the unified line buffer memory 180 through the multiplexer 160 under the control of the FIFO controller 152. That is, a color component is read from a FIFO memory 154, 156, 158 and written in the unified line buffer memory 180. In this case, the FIFO controller 152 is used to control the multiplexer 160 such that each color component is stored in the format for the JPEG compressor 200, i.e., such that the color components are stored in sequence into the unified line buffer memory 180 in the order of 16 luminance components Y, 8 chrominance components U, and 8 chrominance components V. Accordingly, to start, the 16 luminance components Y are read out from the FIFO_Y memory 154, and then the 8 chrominance components U are read out from the FIFO_U memory 156, and then the 8 chrominance components V are read out from the FIFO_V memory 158. After repeating the foregoing process, the image data of 8 lines (8*H pixels) are stored into the unified line buffer memory 180. Namely, each line in the unified line buffer memory 180 stores the H luminance components Y, the H/2 chrominance components U, and the H/2 chrominance components V.

Figure 5:
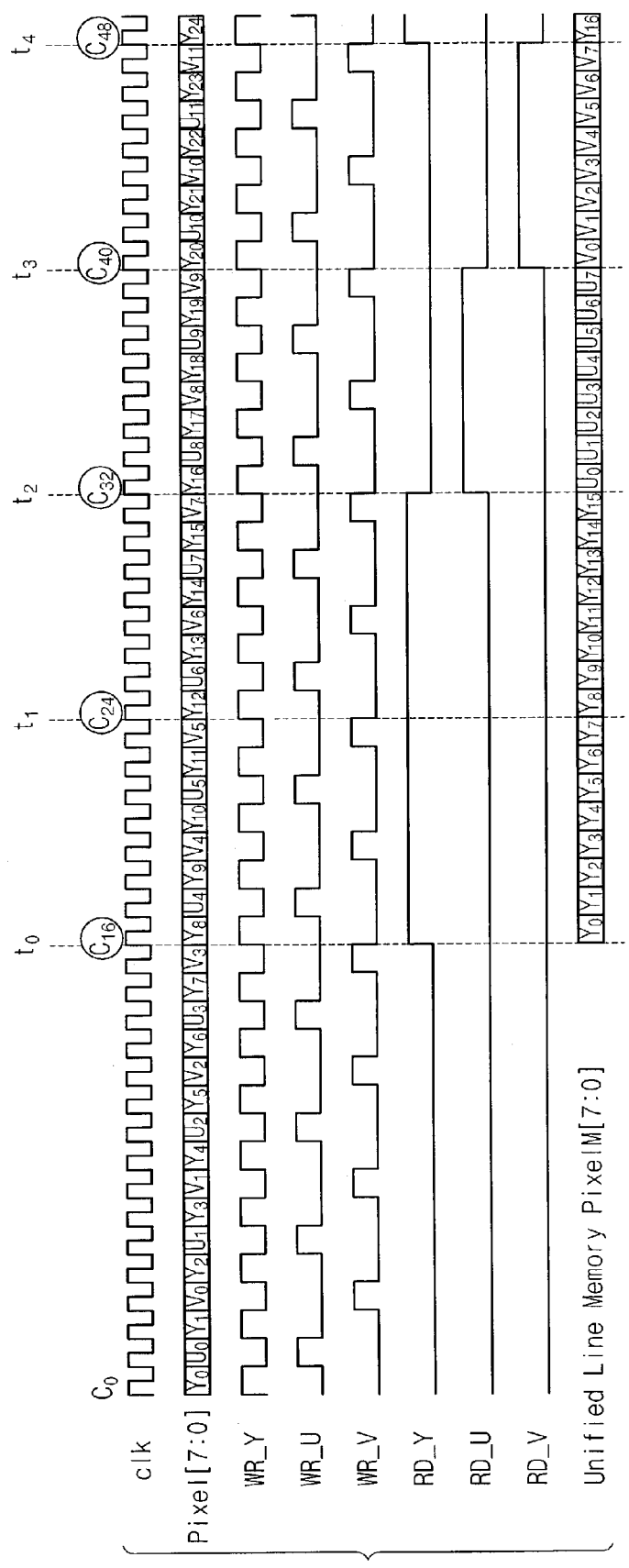
FIG. 5 is a timing diagram for illustrating that color components are stored in the unified line buffer memory of the image processing apparatus of FIG. 4.

The operation of the exemplary line buffer system 150 of FIG. 4 will be explained reference with FIG. 5 and FIGS. 6A-6E. FIG. 5 is an exemplary timing diagram of the exemplary line buffer system 150 for the 4:2:2 format.

Referring to FIGS. 5 and 6A-6E, storing each color component in one unified line buffer memory 180 will be described more fully hereinafter. FIG. 5 is a timing diagram for illustrating that image data Y0U0Y1V0Y2U1Y3V1 . . . in raster format from the image data processor 100 is stored linearly in the unified line buffer memory 180 in the order of (Y0Y1 . . . Y15)(U0U1 . . . U7)(V0V1 . . . V7)(Y16Y 17 . . . Y31)(U8U9 . . . U15)(V8V9 . . . V15).

FIGS. 6A to 6E are schematic diagrams for illustrating that respective color components are stored in each of FIFO memories 154, 156, and 158.

In an exemplary embodiment, the FIFO_Y and FIFO_U memories 154 and 156 are 8 bytes and the FIFO_V memory 158 is 10 bytes.

Referring to FIG. 5, a clock CLK is generated from the image data processor 100. In synchronization with the clock CLK, the image data is output from the image data processor 100 in the order of Y0U0Y1V0Y2U1Y3V1 . . . , i.e., raster format. The FIFO controller 152 controls write signals WR_Y, WR_U, and WR_V so as to store the image data generated from the image data processor 100 into each FIFO memory 154, 156, and 158 by color component. In addition, the FIFO controller 152 controls read signals RD_Y, RD_U, and RD_V so as to transfer the color components stored in each FIFO memory 154, 156, and 158 to the unified line buffer memory 180 through the MUX 160 in the sequence of a block unit. The write signals WR_Y, WR_U, and WR_V and the read signals RD_Y, RD_U, and RD_V act on the respective FIFO memories 154, 156, and 158. The write signal WD_Y for writing the luminance component Y to the FIFO_Y memory 154 is activated at every odd numbered clock CLK, the write signals WD_U and WD_V for writing the chrominance components U and V are activated alternately at every even numbered clock CLK, or at an inactivation period of the read signal WD_Y. Thus, luminance component Y0 at first a clock C0 is stored in the FIFO_Y memory 154, chrominance component U0 is stored in the FIFO_U memory 156 at a second clock C1, Y1 is stored in the FIFO_Y memory 154 at a third clock C2, chrominance component V0 is stored in the FIFO_V memory 158 at a fourth clock C3, Y2 is stored in the FIFO_Y memory 154 at a fifth clock C4, U1 is stored in FIFO_U memory 156 at a sixth clock C5, Y3 is stored in the FIFO_Y memory 154 at a seventh clock C6, and V1 is stored in the FIFO_V memory 158 at an eighth clock C7.

When the FIFO_Y memory 154 is filled, a reading operation starts with the FIFO_Y memory 154 before a new luminance component Y is written into the FIFO_Y memory 154. For example, in case of an 8 byte FIFO_Y memory, since an eighth luminance component Y7 is stored in the FIFO_Y memory at a 15th clock C14, a first read signal RD_Y for luminance component Y is activated at a 17th clock C16. Read signal RD_Y is activated every 16 clocks (for example, during 17th clock C16~32nd clock C31). At this time, 16 luminance components Y0~Y15 are stored (written) into the unified line buffer memory 180 with a linearly increasing memory address. Meanwhile, the read signals RD_U and RD_V are activated alternately during an inactivation period of the read signal RD_Y, or during 16 clocks C32~C47 following the 16 clocks where the read signal RD_Y is activated. For instance, the read signal RD_U is activated during 8 clocks C32~C39 and the read signal RD_V is activated during the following clocks C40~C47. Thus, the 8 chrominance components U and the 8 chrominance components V are read from each of the FIFO memories 156 and 158 and written into the unified line buffer memory 180. Next, reading operation is performed with the luminance component Y during the following 16 clocks C48~C63, reading operation is performed with the chrominance component U during following 6 clocks C64~C71, and reading operation is performed with the chrominance component V during following 8 clocks C72~C79. By repeating the foregoing read operation, as addresses increase linearly in the unified line buffer memory 180 (for example, addresses increase in succession from address 0 to address H*8*2–1), the total H*8*2 color components are stored into the unified line buffer memory 180. Since write addresses for the unified line buffer memory 180 increase in succession, the write addresses generator can be readily embodied by using a simple counter.

In this case, while color components are read from each FIFO memory 154, 156, and 158, the image data processor 100 continues to output image data in synchronization with the clock CLK. Therefore, new color components continue to be written into each of the FIFO memories 154, 156, and 158. As a result, reading and writing operations for the FIFO memories 154, 156, and 158 are simultaneously carried out and will be described with reference to an example shown in FIGS. 6A to 6E.

Figure 6A:
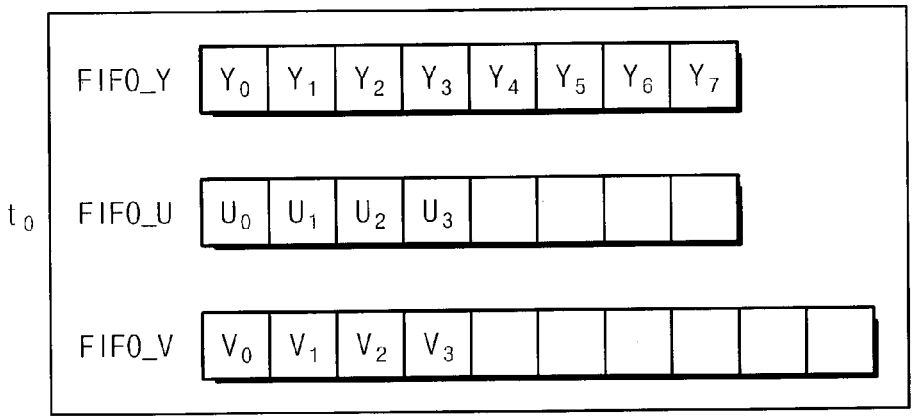
FIGS. 6A to 6E illustrate color components stored in each FIFO memory at the time of t0~t4 in the timing diagram of FIG. 5.
Figure 6B:
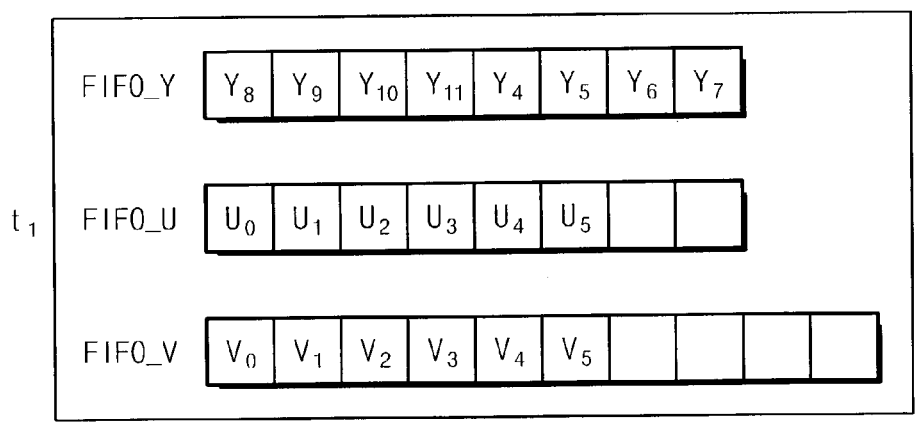

FIGS. 6A to 6E illustrate color components stored in each FIFO memory 154, 156, and 158 at time t0, t1, t2, t3, and t4, respectively. Referring to FIG. 6A, at time t0, i.e., just before the 17th clock C16 is generated, 8 components Y (Y0~Y7) have been stored in the FIFO_Y memory 154, and 4 components U (U0~U3) and 4 components V (V0~V3) have been stored in the FIFO_U and FIFO_V memories 156 and 158, respectively. The FIFO_Y memory 154 of 8 bytes has been filled with the luminance components Y. The FIFO_U memory of 8 bytes and FIFO_V memory of 10 bytes have been partially filled. As described above, a reading operation is performed at 17th clock C16. At the 17th clock C16, first luminance component Y0 is read out from the FIFO_Y memory 154 and written into the unified line buffer memory (for example, at address 0). At this time, 9th luminance component Y8 is written into the FIFO_Y memory 154 at a region where first luminance component Y0 was stored. At an 18th clock C17, second luminance component Y1 is read out from the FIFO_Y memory 154 and written into the unified line buffer memory (for example, at address 1), and at this time 5th chrominance component U4 is written into the FIFO_U memory 156. At a 19th clock C18, 3rd luminance component Y2 is read out from the FIFO_Y memory 154 and written into the unified line buffer memory (for example, at address 2), and at this time, 10th luminance component Y9 is written into the FIFO_Y memory 154. At a 20th clock C19, 4th luminance component Y3 is read out from the FIFO_Y memory 154 and written into the unified line buffer memory (for example, at address 3), and at this time, 5th chrominance component V4 is written into the FIFO_V memory 158. Thus, at time t1, as illustrated in FIG. 6B, the 8 luminance components Y (Y0~Y7) have been read from the FIFO_Y memory, and there exist the new 4 luminance components Y (Y8~Y11) and the prior 4 luminance components Y (Y4~Y7), and 6 color components exist in the FIFO_U and FIFO_V memories, respectively. In this way, color components are read out from FIFO memories 154, 156, 158 and new color components are written into the FIFO memories 154, 156, 158.

Figure 6C:
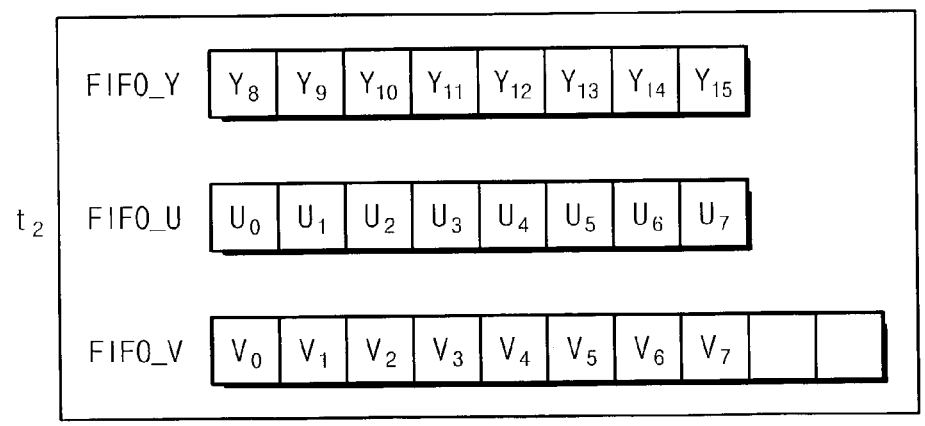

As illustrated in FIG. 6C, at time t2, or at a 33rd clock C32 where the read signal RD_Y is inactivated, a reading operation is complete for the luminance components Y8~Y15 (between t1 and t2) in the FIFO_Y memory 154. Consequently, 16 luminance components Y (Y0~Y15) have been written into the unified line buffer memory 180. At this time, the luminance components Y8~Y15 are in the FIFO_Y memory 154. The FIFO_U memory is filled with chrominance components U0~U7. The chrominance components V0~V7 are stored in the FIFO_V memory and an additional 2 chrominance components V (V8 and V9) can be stored during the following 8 clocks C32~C39.

Figure 6D:
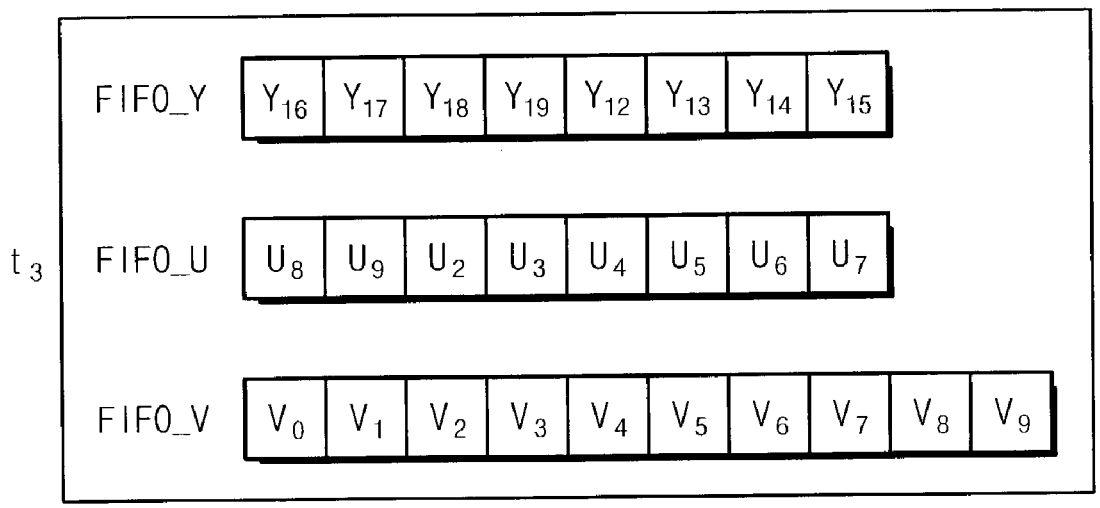

Referring to FIG. 6D, at time t3 (at a 41th clock C40), the chrominance components U0~1 have been read out from the FIFO_U memory 156 and written into the unified line buffer memory 180 (for example, at addresses 16~23), and the chrominance components U8 and U9 are written in the FIFO_U memory 156. Meanwhile, 4 luminance components Y (Y16 to Y19) have been written into the FIFO_Y memory 154 and the chrominance components V8 and V9 have been written in the FIFO_V memory 158. As a result, the FIFO_V memory 158 is filled with chrominance components V.

Figure 6E:
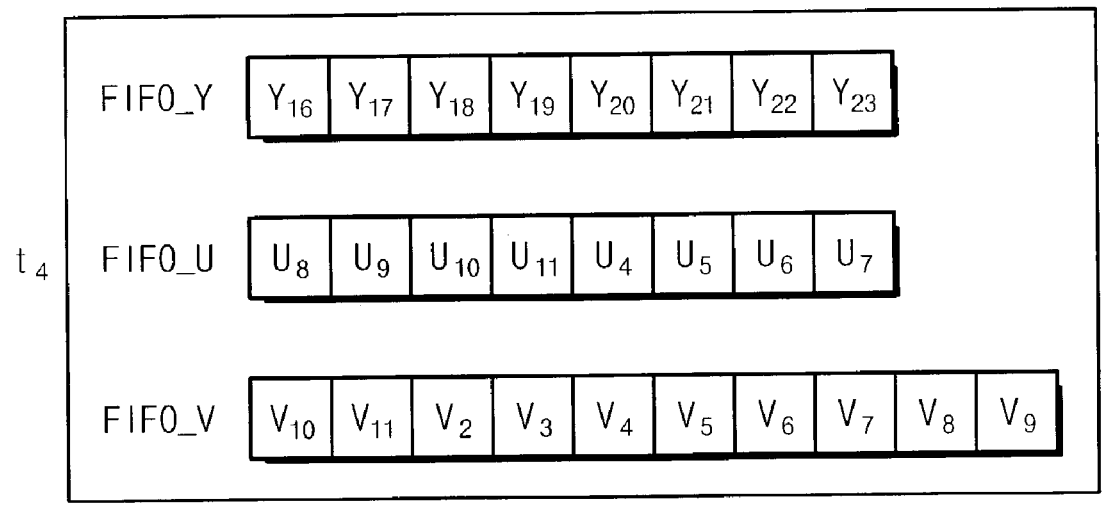

Referring to FIG. 6E, at time t4 (at a 49th clock C48), the chrominance components V0~V1 have been read out from the FIFO_V memory 158 and written into the unified line buffer memory (for example, at address 23~24), and the chrominance components V10 and V11 have been in the FIFO_V memory 158. Meanwhile, the 4 luminance components Y (Y20~Y23) have been in the FIFO_Y 154 memory and, as a result, the luminance components Y16~Y23 are in the FIFO_Y memory 154. The chrominance components U10 and U11 are newly written into the FIFO_U memory 156.

While color components are read from the FIFO memories 154, 156, 158 as described above, new color components, which are provided from the image data processor 100, are written in corresponding FIFO memories 154, 156, 158.

In the method of storing all color components in the unified line buffer memory 180, after storing the 8 components Y in the FIFO_Y memory 154, an initial read operation of the component Y begins. However, according to another exemplary embodiment, various changes and modifications are also possible. In other words, in the case of using a FIFO_Y memory of 16 bytes, after the 16 components Y are stored in the FIFO_Y memory 154, a read operation may start with an initial component Y. In this example, the FIFO_Y memory 154 may be 16 bytes, the FIFO_U memory 156 may be 12 bytes, and the FIFO_V memory 158 may be 14 bytes. Even in this case, after storing the 8 components Y in the FIFO_Y memory 154, a read operation may start with an initial component Y.

In addition, even if the format of the image data provided from the image data processor 100 changes, a size of the FIFO memory 154, 156, 158 may be adjusted to store the image data in the unified line buffer memory 180 such that a read operation is easily performed on a block unit.

Figure 7:
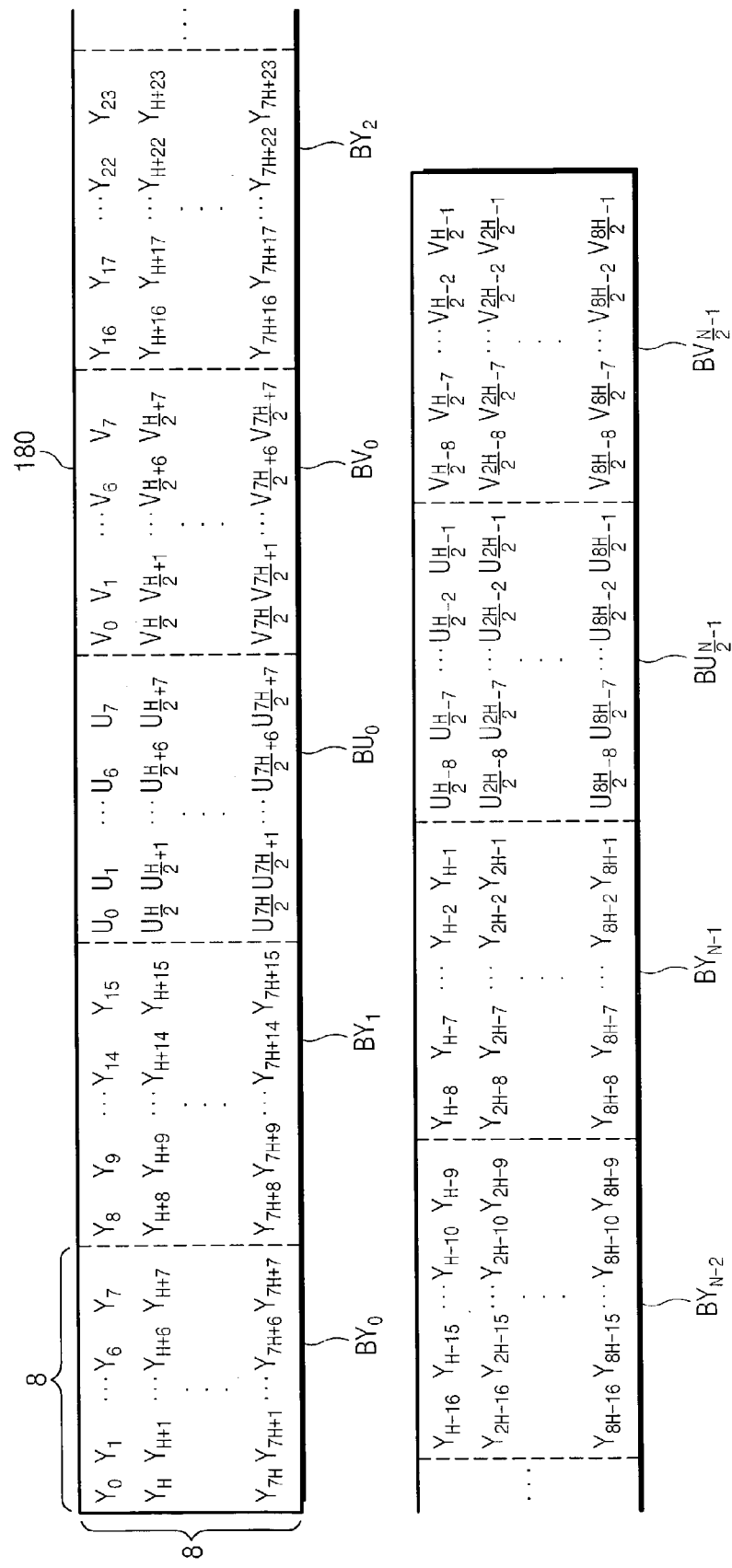
FIG. 7 is a schematic diagram illustrating image data stored in an exemplary embodiment of the unified line buffer memory in a raster scan order.

FIG. 7 is a schematic diagram of the unified line buffer memory 180 in which the image data are stored. The unified line buffer memory 180 has a size of H*8*2 bytes and the memory address increases in series in a raster scan order (i.e., from left to right and from top to bottom). The image data in each line are repeatedly stored in the order of the 16 components Y, the 8 components U, and the 8 components V. Accordingly, a read address generating circuit for reading on an 8*8 block unit can be easily embodied.

The blocks are read in the order of the luminance block BY0, the luminance block BY1, the chrominance block BU0, the chrominance block BV0, the luminance block BY2, the luminance block BY3, the chrominance block BU1, the chrominance block BV1, . . . , the luminance block BY(N−2), the luminance block BY(N−1), the chrominance block BU(N/2−1), the chrominance block BV(N/2−1). Here, N equals H/8, i.e., a value obtained by dividing a horizontal resolution of the image data by 8.

More specifically, the image data are read out from the unified line buffer memory 180 in a sequence of block as follows. The image data at addresses 0~7, addresses **2*H~2*H+7, addresses 4*H~4*H+7, addresses 14*H~14*H+7 are sequentially read out from the unified line buffer memory 180 to form luminance block BY0. Then, image data at addresses 8~15, addresses 2*H+8~2*H+15, addresses 4*H+8~4*H+15, addresses 14*H+8~14*H+15 are read out from the unified line buffer memory 180 to form luminance block BY1**. In this way, all the image data of 2*N blocks are read out from the unified line buffer memory 180 in block units.

A read address Add_R for reading on an 8*8 block unit from the unified line buffer memory 180 is produced by the following Equation 2 and can be readily embodied by using a counter.

[Equation 2]

```
for(i=0;i<(H*2)/8;i++){
    for(vv=0;vv<8;vv++){
        for(hh=0;hh<8;hh++){
            Add_R=vv*H*2+i*8+hh;
        }
    }
}
```

In Equation 2, i is a variable standing for the block order of the unified line buffer memory 180, and "vv" and "hh" represent vertical and horizontal variables of the block.

It is further noted that additional unified line buffer memories 180 may be used. That is, while image data of 8 lines are written in a first unified line buffer memory 180 as described above, the image data can be read in a block unit from a second unified line buffer memory. If the image data of 8 lines are completely written and read, new image data of 8 lines are written in the second unified line buffer memory 180 and the prior image data written in the first unified line buffer memory 180 are read in a block unit.

While the method of converting data of a raster format into data of a block format is described above, the method can be applied to inverse conversion, i.e., conversion of data of a block format into data of a raster format.

When the line buffer system of an exemplary embodiment of the present invention and the typical line buffer system, which uses a separate line buffer memory by each color component, were applied to a VGA standard, the following Table 1 shows comparison of the number of required equivalent gates therebetween.

TABLE 1

|  | Conventional line buffer system | single unified line buffer system of the present invention |
|---|---|---|
| memory bits | 81920 | 81920 |
| equivalent gate number for embodying the line buffer system | 162280 | 128352 |
| Equivalent gate number for embodying FIFO memory | 0 | 2200 |
| total gate number | 162280 | 130552 |

The number of memory bits of the line buffer system of an exemplary embodiment of the present invention is the same as that of the typical line buffer system. In case of the conventional method using a separate line memory for each color component, the number of bits of the line memory is 640*8*8+(640/2)*8*8*2=81920. In case of the exemplary embodiment of the present invention using a unified line buffer memory 180, the number of bits of the line memory is 640*8*8*2=81920. However, while the typical method using three line memories requires a peripheral circuit for each line memory, the exemplary embodiment of the present invention requires only one peripheral circuit. Accordingly, the number of gates for embodying the line memory of the conventional method is 162280, and the number of gates for embodying the line memory of the exemplary embodiment of the present invention is 128352. The results were obtained through a simulation on the assumption that the line memory is embodied from a single port SRAM.

Because the exemplary embodiment of the present invention includes a FIFO memory including 8-byte FIFO_Y, 8-byte FIFO_U, and 10-byte FIFO_V, 2200 gates are needed to embody the FIFO memories. However, in case of the typical line memory system, the number of total required gates is 162280, and the exemplary embodiment of the present invention requires total 130552 gates. It can be seen that the exemplary embodiments of the present invention requires fewer gates than the conventional circuit.

Figure 8:
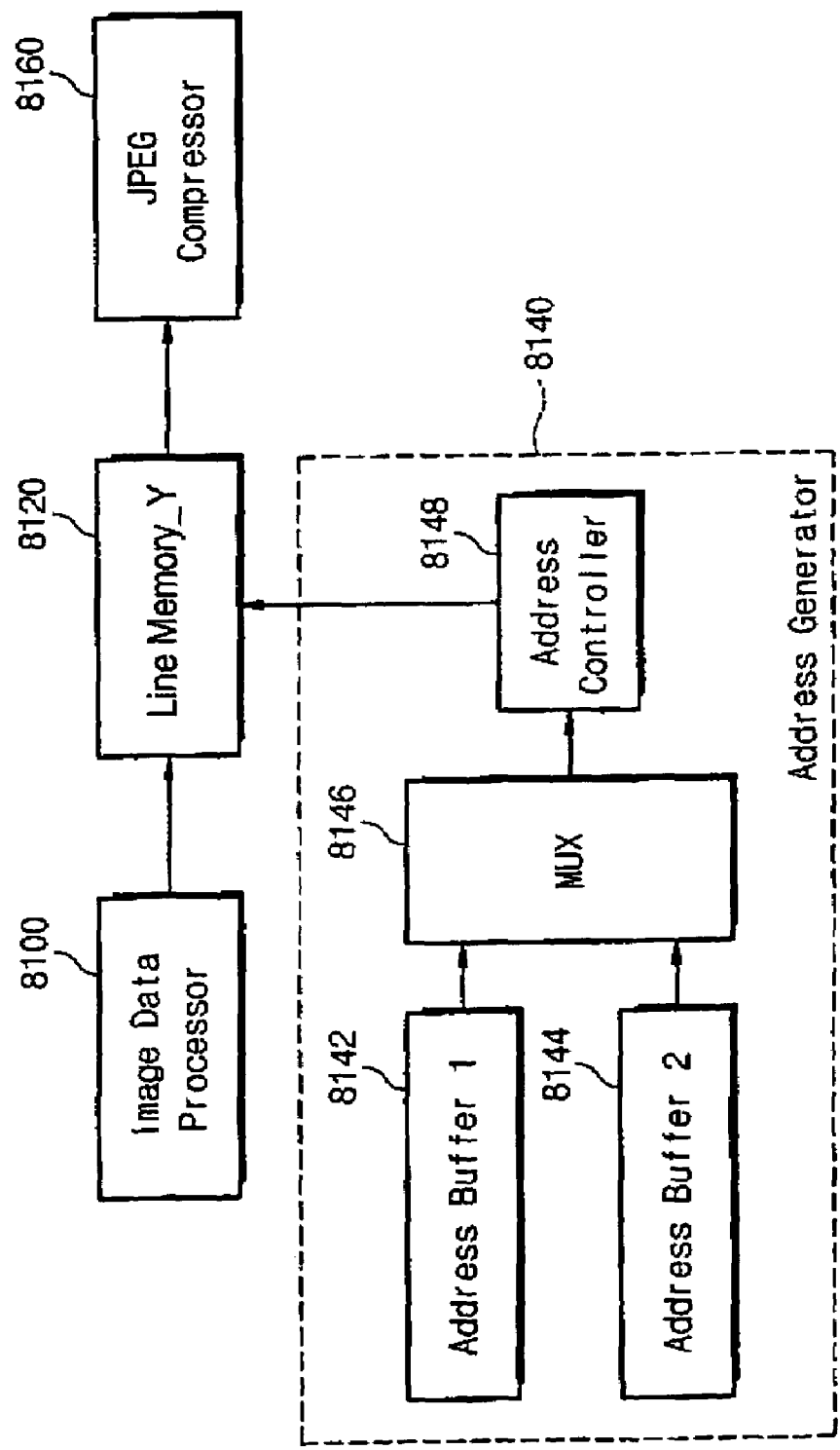
FIG. 8 is a schematic block diagram of an image processing apparatus using a single line memory according to another exemplary embodiment of the present invention.

FIG. 8 is a schematic block diagram of an image processing apparatus including a single line memory according to another exemplary embodiment of the present invention. The image processing apparatus of this exemplary embodiment of the present invention includes an image data processor 8100, a unified line memory 8120, an address generator 8140, and a JPEG compressor 8160. The image data processor 8100 generates image data. The image data is divided into a luminance component Y and chrominance components U and V. In FIG. 8, only a line memory_Y (8120) for the luminance component Y is shown. The image data processor 8100 outputs image data in synchronization with a clock. Chrominance components Y from the image data processor 8100 are stored into the line memory_Y (8120). If the image data, which will be processed, has a resolution of V*H and the JPEG compressor 8160 processes the image data on a v*h block unit, the line memory_Y (8120) has a size of v*H bytes. For example, in case of JPEG compression, v equals h and h equals 8 (v=h=8). Hereinafter, the case that VGA standard will be described as an example.

The address generator 8140 generates read and write addresses for the line memory_Y (8120). In an exemplary embodiment of the present invention, the read address of the line memory_Y(8120) is the same as the write address of the line memory_Y (8120). That is, a write operation is performed with a memory cell into which an address for read operation is applied. The address generator 8140 in an exemplary embodiment of the present invention includes a pair of address buffers 8142 and 8144, multiplexer 8146 for selecting one of the address buffers, and an address controller 8148. Each of the address buffers 8142 and 8144 has a size of ⅛ of the line memory_Y (8120) and the pair of address buffers 8142 and 8144 have a size of ¼ of the line memory_Y (8120).

The address controller 8148 generates read and write addresses for the address buffers and synthesizes a common read/write address for the line memory. Each of the address buffers 8142 and 8144 store anchor addresses for 8*H pixels stored in the single line memory_Y (8120). Accordingly, the anchor addresses are 0, 1, 2, 3, . . . , 637, 638, 639, and each address buffer 8142, 8144 stores 640 anchor addresses. As described above, each address buffer 8142, 8144 stores the anchor addresses in a different order.

The address controller 8148 generates a read address and a write address for the address buffers 8142, 8144 to read out the anchor address from the address buffers 8142, 8144 and write the read anchor address into the address buffers 8142, 8144. The address controller 8148 synthesizes the common read/write address for the line memory_Y (8120) based on the read anchor address. With reference to the common read/write address, image data are read out from and new image data are written into the single line memory 8120. That is, an address of a first pixel of a segment is obtained by multiplying the anchor address read out by the read address by 8 and a read/write address of 8 pixel of the segment is obtained by adding 0~7 in sequence to the address of the first pixel.

The anchor address read out from one address buffer with reference to the read address is stored in the other address buffer with reference to the write address. The read address is (640/8)*vv+i corresponding to block scan order where, "i" represents a block order of image data and increments from 0 to 79(=640/8−1). "vv" is a variable represents for the number of lines of each block and increments from 0 to 7 with respect to each "i". In other words, the anchor addresses stored in address 0, 80, 160, . . . , 560, 1, 81, . . . of the address buffer are read. On the other hand, the write address always increments from 0 to 639.

Common read/write address crw_addr are obtained by Equation 3 as follows.

[Equation 3]

```
for(i=0;i<640/8;i++){
    for(vv=0;vv<8;vv++){
        for(hh=0;hh<8;hh++){
            rd_addr=vv*640/8+i;
            crw_addr=f[rd_addr]*8+hh
        }
    }
}
``` where, "vv*640/8+i" is the read address rd_addr, and f[rd_addr] is the anchor address stored at address of the address buffer pointed by the read address rd_addr.

When another value is used in place of 640 in Equation 3, a common read/write address corresponding to a size of image which will be processed can be generated.

For example, 640 maybe replaced 1280 when VGA images having three components Y, U and V are processed While image data of 8 lines, i.e., 8*640 pixels are processed, each address buffer 8142, 8144 has a read or write operation mode. That is, the read address is applied to one address buffer 8142 to read the anchor addresses, and the write address is applied to the other address buffer 8144 to write the read anchor addresses. When the image data of 8 lines are processed, a selection signal with respect to the multiplexer 8146 is changed to change the operation mode of each address buffer. The read address is applied to the address buffer 8144 into which the write address had been applied, and the write address is applied to the address buffer 8142 into which the read address has been applied.

In another exemplary embodiment, the address controller 8148 generates a read address and a write address for the address buffers 8142, 8144 to read out the anchor address from the address buffers 8142, 8144 and write the read anchor address into the address buffers 8142, 8144. The address controller 8148 generate a read address (assuming a VGA luminance image) obtained by Equation 4 as follows.

[Equation 4]

```
x=0; x'=1;
waddr_anchor = 0;
    For (i=0; i<640/8; i++){
        For (vv=0; vv<8; vv++){
            For (hh=0; hh<8; hh++){
                raddr_anchor = vv·80 + i;
                ABUFx'[waddr_anchor] = ABUFx[raddr_anchor];
                addr1 = ABUFx[raddr_anchor]·8 + hh;
            }
            waddr_anchor ++;
        }
    }
x=~x; x'=~x';
``` where "i" is the block index (0≦i<80), "vv" is the vertical index in a block (0≦vv<7), "hh" is the horizontal index in a block (0≦hh≦7), x, x'=0 or 1 (toggles at the end of loop)

Referring to FIGS. 9A-9D and 10A-10D, operation of an exemplary embodiment of the present inventions will be now described more fully. A line memory storing 8*80 pixels used as an example.

FIG. 9A-9D show that a segment (a line including horizontal 8 pixels constituting a block) of image data is stored in the line memory 8120. FIGS. 10A-10D show that the anchor address is stored into the address buffers 8142, 8144. In FIGS. 9 and 10, addresses of the line memory 8120 and the address buffers 8142, 8144 increase from left to right and from top to bottom.

The image data (raster H1) of 8*80 pixels, which are generated from the image data processor 100, are written into the line memory_Y (8120) at address from 0 to 639. That is, 80 segments (segment 0~segment 79) are stored in the line memory 120 as illustrated in FIG. 9A. For example, the segment 0 comprises pixels 0~7, and the segment 1 comprises pixels 8~15, and the segment 10 comprises pixels 80~87. At this time, the anchor addresses 0~79, which are generated for every 8 pixels (i.e., which maintain a fixed value for every 8 pixels), are stored into address buffer 142 at address from 0 to 79 in sequence as illustrated in FIG. 10A. The anchor addresses 0~79 correspond to values obtained by dividing the address into which a first pixel of each segment is stored by 8 when image data (8*80 pixels) of initial 8 lines are stored into the single line memory_Y (8120) in sequence. Accordingly, the anchor addresses 0~79 indicate the addresses of the line memory_Y (8120) in which a first pixel of each segment is stored when the anchor address is multiplied by 8. The order of storing the segments in the line memory_Y (8120) shows that the image data are stored into the addresses of the line memory_Y (8120) corresponding to the anchor addresses in that order.

When 640 pixels are all stored into the line memory_Y (8120), the read address for the address buffer 8142 is generated by the address controller 8148. The read address is given as from Equation 3 or 4. That is, the read addresses for the address buffer 8142, 8144 are generated in the order of 0, 10, 20, 30, 40, 50, 60, 70, 1, 11, 21, 31, . . . and multiplied by 8 to obtain values of first pixels of respective segments.

To generate the 8*8 block, the common read/write address for the line memory is synthesized by the address controller 8148 according to Equation 3 or 4. In other words, the read address is applied to the address buffer1(8142) to read the anchor address, and the read anchor address is multiplied by 8 to obtain a value of the first pixel of the segment. Then, the values of the first pixels of the segments are added by 0~7 to synthesize the common read/write address of pixels of the segment.

A read operation is performed with the line memory_Y (8120) on a block unit referring to the common read/write address. In this case, 8*80 pixels (raster H2) of new 8 line image data, which are generated from the image data processor 8100, are written into the line memory_Y (8120) referring to the common read/write address, as illustrated in FIG. 9B. The read anchor addresses are stored in sequence into the address buffer 144 referring to the write addresses, which increment from 0 to 79, as illustrated in FIG. 10B. After the common read/write address is generated according to Equation 3 or 4, read and write operations are performed in the line memory 8120. At this time, the anchor address with respect to the common read/write address are stored into the address buffer 144 which coincides with the anchor address of the address buffer 1(8142) read by the read address.

As described above, the $0^{th}$ segment of the raster H2 is stored at address 0~7 (in which the $0^{th}$ segment of the raster H1 is stored) of the line memory, the second segment of the raster H2 is stored at address 10*8~10*8+7 (in which the $10^{th}$ segment of the raster H1 is stored) of the line memory, and the third segment of the raster H2 is stored in the address numbers 20*8~20*8+7 (in which the $20^{th}$ segment of the raster H1 is stored ) of the line memory. At this time, the anchor addresses 0, 10, 20 . . . are stored into the address buffer 2(8144) at address 0 to 79. Thus, if the same read address are applied to the address buffer 8144, the raster H2 can be read out on a block unit.

Likewise, the raster H2 is read out from the single line memory 8120 on a block unit and image data (raster H3) of new 8 lines are written into the single line memory 8120 with reference to a common read/write address. That is, the anchor addresses 0, 21, 42, 63, 5, 26, 47, 68, 10, . . . , which are stored at address 0, 10, 20, 30, 40, 50, 60, 70, 1, . . . are read out from the address buffer 8144 with reference to read address rd_addr=vv*80/8+i, as illustrated in FIG. 10B, and the common read/write address is generated based on the read anchor addresses. Referring to the line memory 8120 of FIG. 9B, the anchor addresses correspond to the segments 0, 10, 20, 30, 40, 50, 60, 70, 1 . . . This corresponds to the block scan order. The raster H2 is read out from the single line memory 8120 on a block unit referring to the generated common read/write address and at the same time image data (raster H3) of new 8 lines are written into the line memory (see FIG. 9C). At this time, anchor address read out from the address buffer 2(8144) are written into the address buffer 1(8142) at address 0~79 in sequence as shown in FIG. 10C.

The anchor addresses 0, 52, 25, . . . are read out from the address buffer 8142 referring to the read address. Based on the read anchor addresses, the common read/write address is generated, and then the raster H3 is read out and image data (raster H4) of new 8 lines are written (see FIG. 9D). The anchor addresses read out from the address buffer 8142 are stored into the address buffer 8144 at address 0 to 79 in sequence (see FIG. 10D).

The foregoing steps are repeated until entire image (a frame of image) is processed. In case of the last 8 lines, only a read operation will be performed. That is, after image data of second last 8 lines are read out and at the same time the image data of the last 8 lines are written, only a read operation is performed for the image data of the last 8 lines. When the entire image is processed, another frame of image data may be processed the same way.

Figure 11:
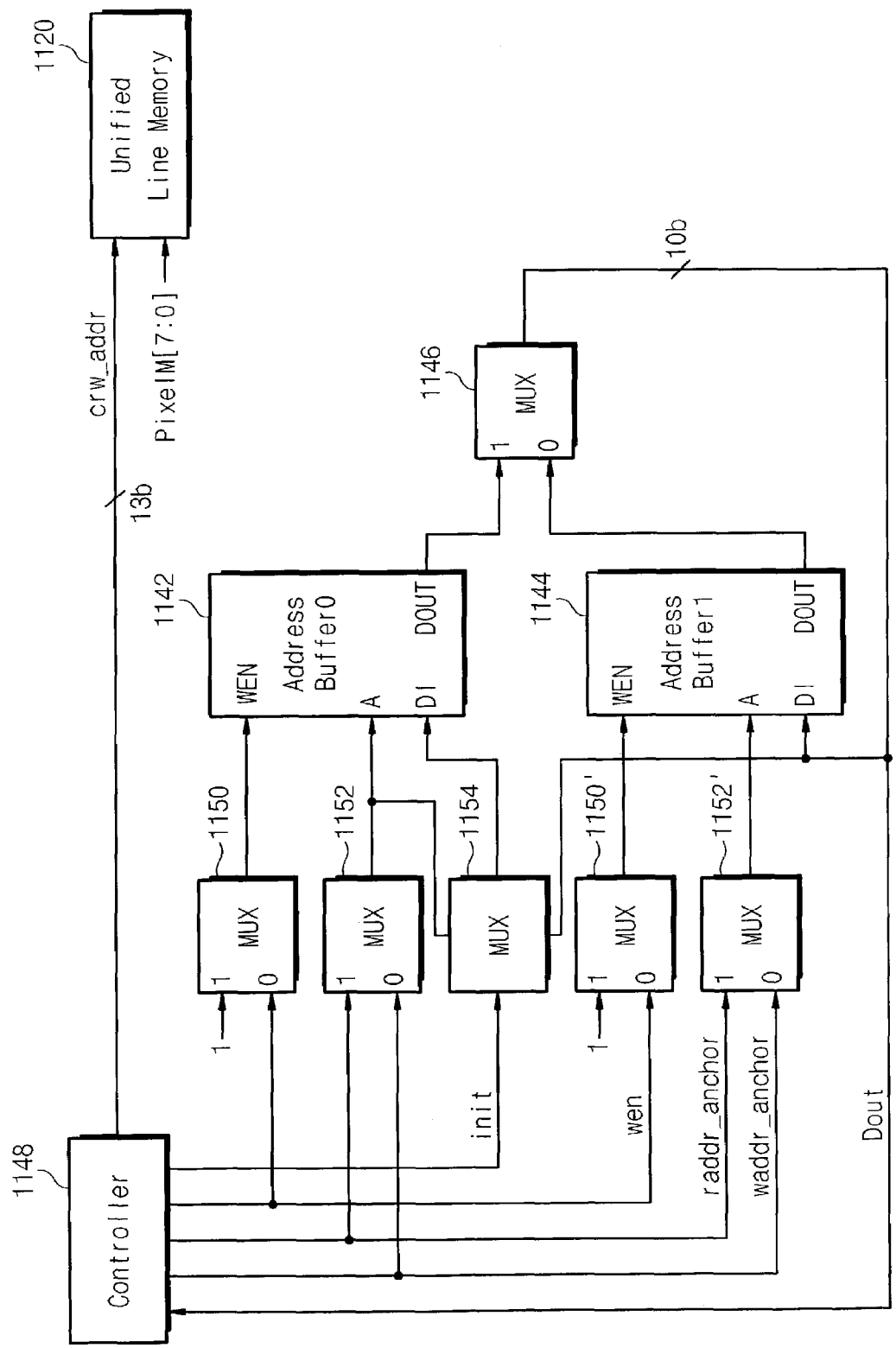
FIG. 11 is a block diagram of an address generator according to an exemplary embodiment of the present invention.

FIG. 11 is a schematic block diagram of an address generator 8140 according to another exemplary embodiment of the present invention. The luminance VGA standard will also be used as an example hereinafter. In case of the VGA standard, since a horizontal resolution is 640, the line memory 1120 has a size of 640*8*8 bits. When image data of initial 8 lines (8*640 pixels=5120 pixels) are stored in the line memory 120 at address from 0 to 5119 in sequence, the anchor addresses, which increment for every 8 pixels from 0 to 639, are generated. Accordingly, since the line memory 1120 stores 5120 pixels, the address for the line memory needs 13 bits and the anchor address needs 10 bits. For this reason, each of the address buffers 1142 and 1144 for storing the anchor addresses has a size of 640*10 bits.

A system clock, a horizontal synchronous signal, a vertical synchronous signal, a frame start signal are applied to the address controller 1148. The address controller 1148 generates various control signals for controlling the address buffers 1142, 1144, the multiplexer 1146, 1150, 1150', 1152, 1152', and 1154, and the line memory 1120 in response to the foregoing signals. The control signals include, for example, the anchor address, the write address, the read address, and the common read/write address.

Figure 12A:
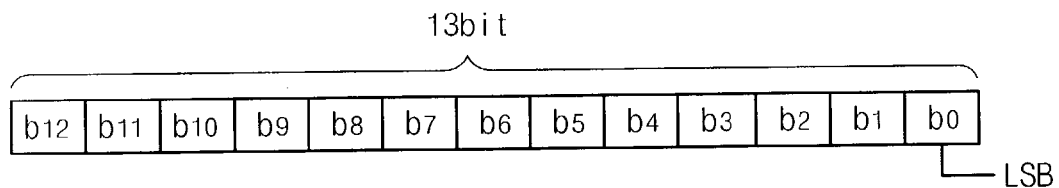
FIGS. 12A and 12B are schematic diagrams of a read address format of the single line memory and an anchor address format stored in address buffers according to an exemplary embodiment of the present invention.
Figure 12B:
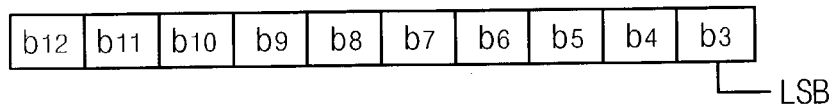

The anchor address may be obtained by using a 3-bit counter. Alternatively, the anchor address can be obtained by shifting a 13-bit address by 3 bits when the image data of initial 8 lines are written into the line memory 1120 referring to the incremented 13-bit address. That is, if the initial write address for writing into the line memory 120 has a least significant bit (LSB) on the right as illustrated in FIG. 12A, the write address of the line memory is shifted to the right by 3 bits, thereby obtaining the anchor address as illustrated in FIG. 12B. In other words, the anchor address maintains the same value for every 8 pixels and increments from 0 to 639.

Figure 13A:
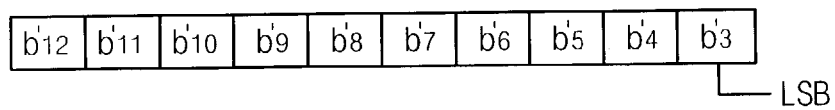
FIGS. 13A and 13B are schematic diagrams of the anchor address and a common read/write address format of the single line memory, which is synthesized from the anchor address according to an exemplary embodiment of the present invention.
Figure 13B:
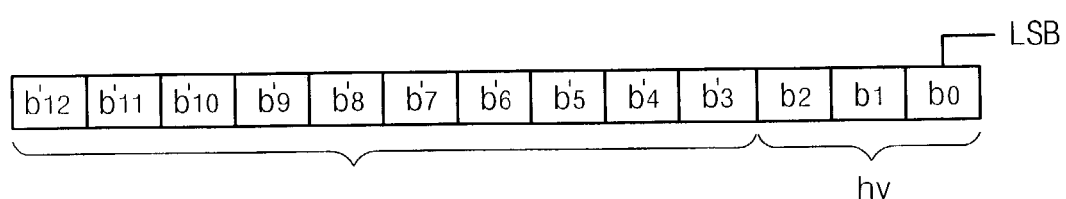

Because the common read/write address is obtained by multiplying the anchor address by 8 and adding 0~7 (which are required to represent horizontal pixels of segments), the common read/write address becomes 13 bits. Multiplying the anchor address by 8 is equivalent to shifting the anchor address by 3 bits, and adding 0~7 can be realized by adding 3 bits. That is, as illustrated in FIG. 13A, shifting 10 bits of the anchor address having LSB on the right to the left by 3 bits is equivalent to multiplying 8. This corresponds to the shifting of the 13 bits of the write address to the right by 3 bits for obtaining the anchor address. Therefore, the result obtained by multiplying the anchor address by 8 indicates the address of a first pixel of each block. Further, as illustrated in FIG. 13B, the result obtained by multiplying the anchor address by 8 is added by 3 bits to obtain horizontal components of each segment of a block. As a result, the common read/write address can be obtained with respect to all pixels of the block.

The address controller 1148 generates the read and write addresses raddr_anchor and waddr_anchor for the address buffers 1142 and 1144. The read addresses can be exemplarily generated by using a counter, multiplier, and adder. The write addresses waddr_anchor are generated on every 8 pixels of 8*640 pixels and increment from 0 to 639. The write address waddr_anchor can be embodied by using a counter. The read operation for the address buffers can be performed un-synchronized. If the read addresses raddr_anchor are applied to the address buffer 1142 and 1144, the anchor addresses at the address corresponding to the applied read address raddr_anchor are output terminals DOUT of the address buffers 1142 and 1144. The write operation for the address buffers is performed in synchronization. That is, when a write enable signal wen for writing operation is in a logic low state, the anchor address is written into a position corresponding to the applied write address waddr_anchor at a rising edge or a falling edge of a clock. The read operation can be performed in synchronization. In this case, a controlling signal for reading operation is applied and the anchor address stored in the applied read address is read out at a rising edge or a falling edge of a clock.

When the address buffer 1142 operates in a read mode (the write enable is at a high level), the address buffer 1144 operates in a write mode. When the address buffer 1142 operates in a write mode (the write enable is at a low level), the address buffer 1144 operates at a read mode. If image data of 8 lines (8*640 pixels) are completely processed, an operation mode of each address buffer is shifted. To accomplish this, the address generator 140 includes MUXes 1150, 1150', 1152, 1152', 1154 and 1146.

The MUX 1150 multiplexes the write enable wen and a logic high signal to transfer to a write mode input terminal WEN of the address buffer 1142. The MUX 1150' multiplexes the write enable wen and the logic high signal to transfer to the write mode input terminal WEN of the address buffer 1144 and operates complementarily with respect to the MUX 1150.

The MUX 1152 multiplexes the read and write addresses raddr_anchor and waddr_anchor to transfer to an address input terminal A of the address buffer 1142. The MUX 1152' multiplexes the read and write addresses raddr_anchor and waddr_anchor to transfer to the address input terminal A of the address buffer 1144 and operates complementarily with respect to the MUX 1152. Accordingly, when one address buffer operates on a write mode, the other address buffer operates in a read mode.

Figure 14:
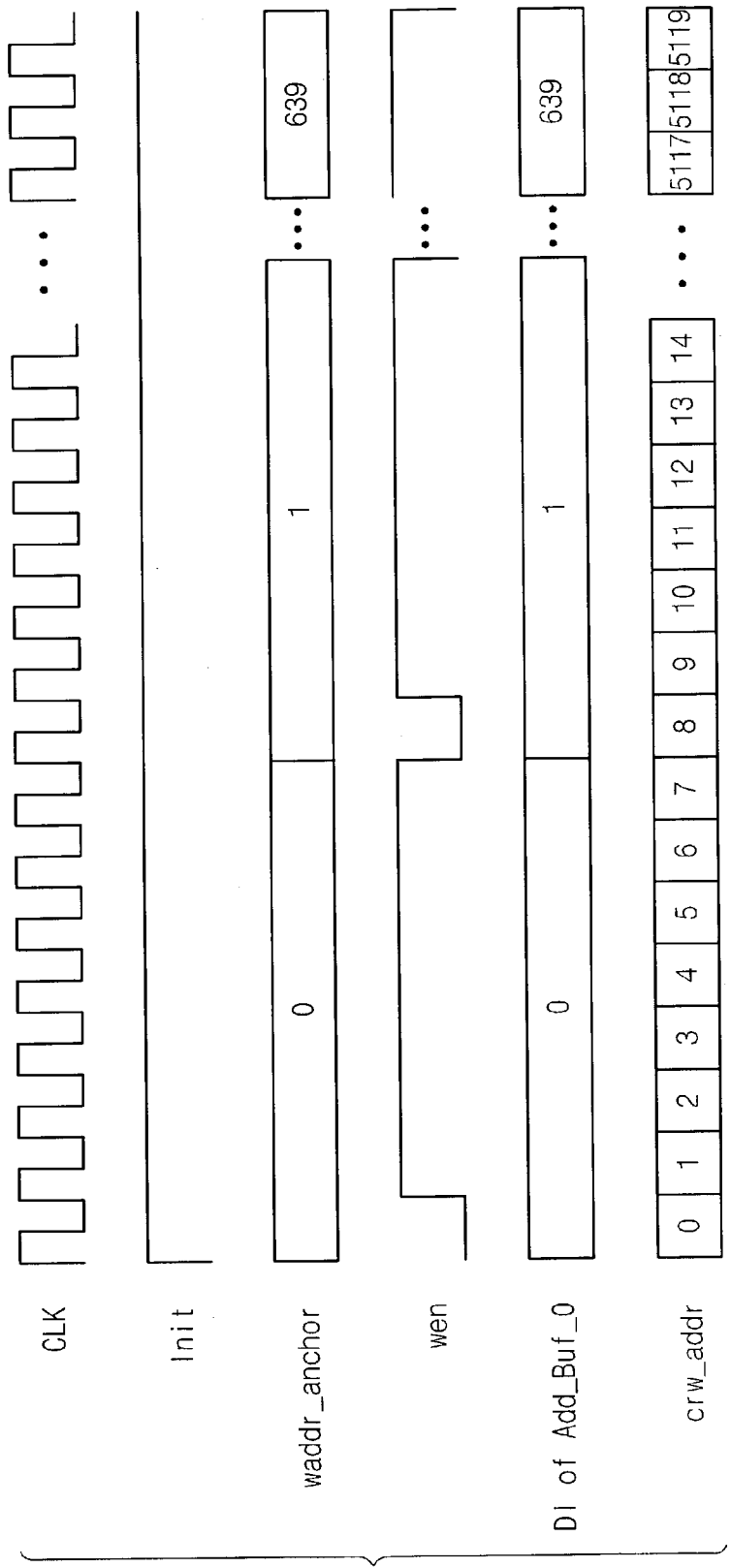
FIG. 14 is a timing diagram showing an initializing procedure according to an exemplary embodiment of the present invention.

The address controller may be initialized when the first image data (PixelM [7:0]) is inputted into the line buffer memory 1120 from the image data processor 100 in FIG. 8. FIG. 14 is a timing diagram showing an initializing procedure according to an exemplary embodiment of the present invention.

The address controller 1148 generates the initializing signal (init), a write enable signal (wen) for the address buffer 1142, and write addresses (waddr_anchor). The write address increases from 0 to 639 by step 1 sequentially (waddr_anchor in FIG. 14). The wen signal becomes low during one clock time at every 8 clocks.

During the initialization, a data input port (DI) of address buffer 1142 is connected to waddr_anchor, therefore each location of address buffer 1142 stores its address. At the same time, the data from the image data processor 100 are stored in the unified line memory 1120 sequentially from address 0 to the last address.

After initialization, the contents of the address buffer 1142 are shown in FIG. 15. Also, after initialization, the init signal is disabled, therefore the data input port of the 1142 is connected to output port of the MUX 1146 through the MUX 1154.

The address controller 1148 outputs the wen, raddr_anchor, waddr_anchor signals. The waddr_anchor signals are generated the same as during initialization, as describe above. The wen signal makes the address buffer 1 1144 writable. The anchor address is determined by Equation 3 or 4, i.e., the content of the address buffer whose address is vv*80 +i. When the anchor address is determined, the address stored in the address buffer 1144 is inputted to the address controller 1148.

The address controller 1148 calculates the line memory address by the equation $$addr1 = ABUFx[vv*80+i]*8+hh,$$

wherein, the value of ABUFx[vv*80+i] is anchor address.

Figure 16:
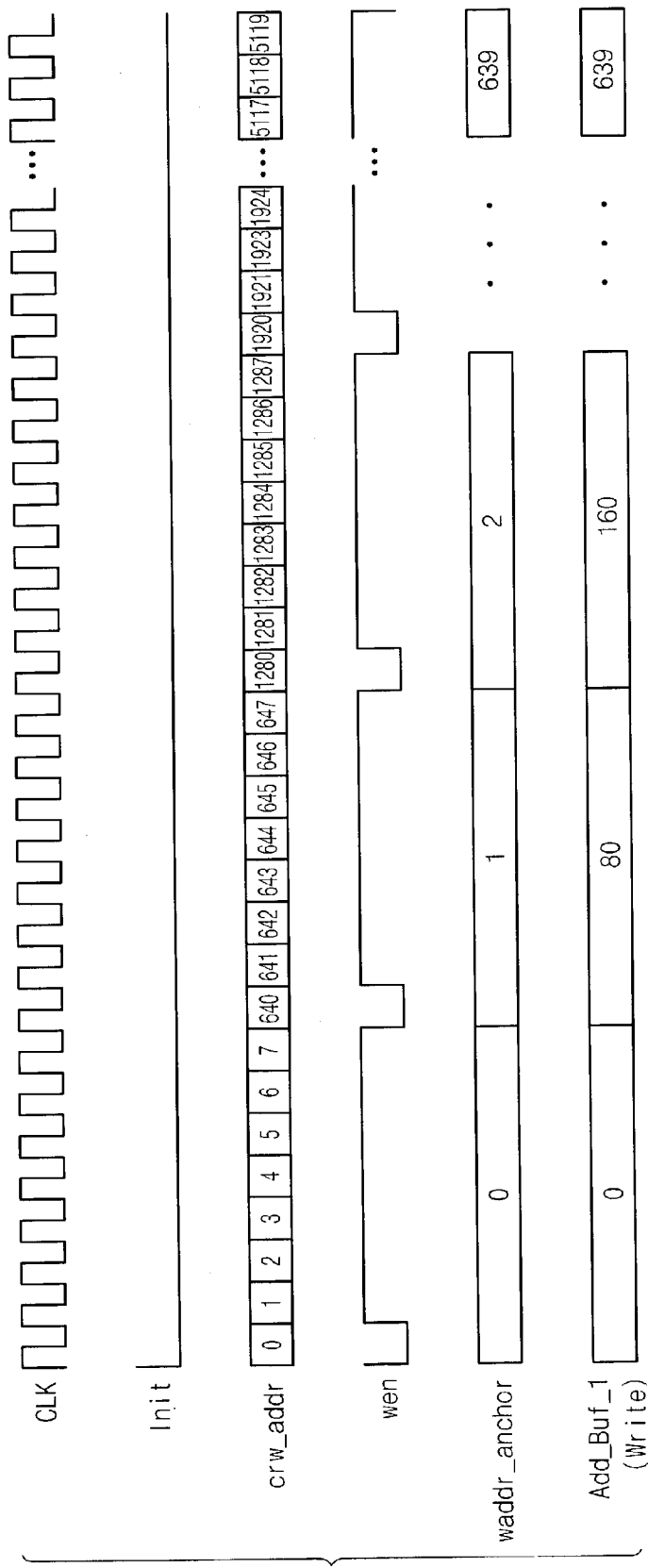
FIG. 16 is a timing diagram showing a write procedure for writing an address in an address buffer according to an exemplary embodiment of the present invention.

The read addresses for the address buffer 1142 are shown in FIG. 15. The procedure for writing the address in address buffer 1144 is shown in FIG. 16 and timing diagram for read and write is drawn in FIG. 17.

FIG. 18 shows the contents of the address buffer 1142 for the next 8 pixel rows.

The MUX 1146 multiplexes the anchor address generated from the output terminals DOUT of the address buffers to transfer to the address controller 1148 and the address buffers. The anchor addresses generated from one address buffer are written in sequence through an input terminal DI of the other address buffer, and inputted in the address controller 1148 to be used to generate the common read/write address.

If the selection signal is logic low ("0"), the MUX 1150 transfers the write enable wen to the write mode input terminal WEN of the address buffer 1142. On the other hand, the MUX 1150' transfers the logic low ("0") to the write mode input terminal WEN of the address buffer 1144. Accordingly, since the write mode input terminal WEN is low active, the address buffer 1144 does not operate in a write mode. However, the address buffer 1 (1144) operates on a write mode if the write enable wen is applied as logic low.

The MUX 1152 transfers the write address waddr_anchor to the address buffer 1142 and the MUX 1152' transfers the read address raddr_anchor to the address buffer 1144. The MUX 1146 selects the output of the address buffer 1144.

Figure 19:
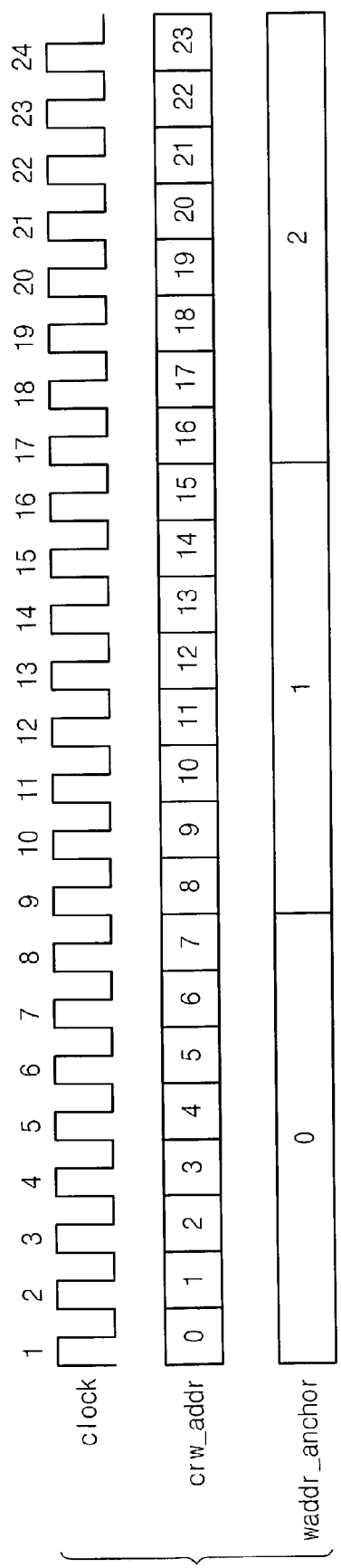
FIG. 19 is a timing diagram showing various signals generated by an address controlling part when VGA standard image data of first 8 lines are stored in the single line memory according to the present invention.

As illustrated in FIG. 19, the image data of 8 lines generated from the image data processor 100 are synchronized with the rising edge of the clock and stored in sequence in the line memory 1120. At this time, select signal is logic low level. Thus, the address buffer 1142 operates in a write mode, the address buffer 1144 operates in a read mode, and the MUX 1146 selects the generation of the address buffer 1144.

When the image data of 8 lines are generated from the image data processor 100 and stored in sequence in the line memory 1120, the anchor addresses, which increment on every 8 pixels from 0 to 639, as well as the write addresses write_addr are generated. Also, the generated anchor addresses 0~639 are stored in the address buffer 1142 in sequence from the address 0 to 639 referring to the write address waddr_anchor. At this time, since the read address raddr_anchor is not generated by the controller 1148, an output does not originated from the address buffer 1144.

When all the image data of 8 lines (8*640 pixels) are written into the line memory_Y(1120), the selection signal of the multiplexing means is shifted from logic low to logic high ("1"). Accordingly, the write enable wen of logic high is inputted into the write mode input terminal WEN of the address buffer 1142. As a result, the address buffer 1142 does not operate in a write mode any more, and the read address raddr_anchor is transferred to the address buffer 1142 through the MUX 1152. That is, the address buffer 1142 is shifted to a read mode. Meanwhile, since the write enable wen of logic low is inputted into the write mode input terminal WEN of the address buffer 1144, the write mode input terminal WEN of the address buffer 1144 becomes active, and the write address waddr_anchor is transferred to the address buffer 1144 through the MUX 1152'. That is, the address buffer 1144 is shifted to a write mode. Meanwhile, the MUX 1146 selects the output of the address buffer 1142 and transfers to the address controller 1148 and the address buffer 1144.

The address controller 1148 generates the read address raddr_anchor and applies the generated read address to the address buffer 1142, thereby reading out the anchor address from the address buffer 1142. The read address raddr_anchor is generated to meet raddr_anchor=v*640/8+i. That is, the read address raddr_anchor is generated in the order of 0, 80, 160, 240, . . . , 560, 1, 81, . Accordingly, the anchor addresses stored in the address buffer0 (1142) at address 0, 80, 160, 240, . . . 560, 1, 81, . . . are output in sequence. The output anchor addresses are input into the address buffer 1144 and the address controller 1148 through the MUX 1146.

Figure 20:
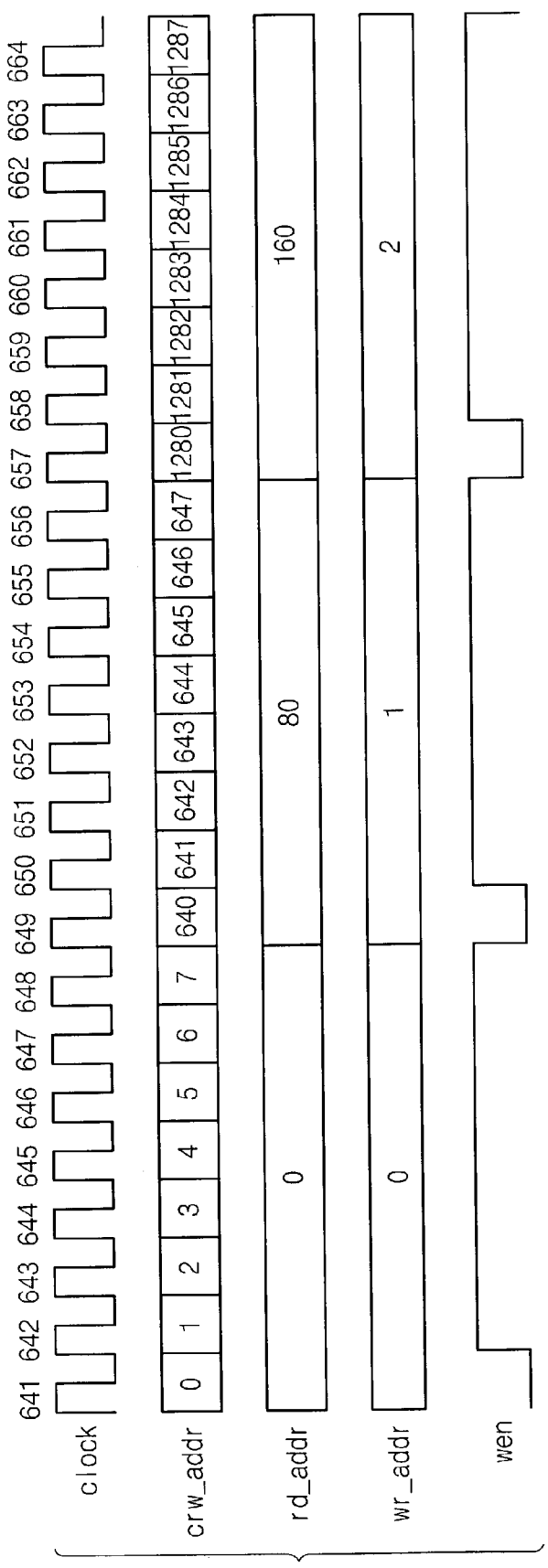
FIG. 20 is a timing diagram showing various signals generated by the address controlling part when VGA standard image data of second 8 lines are stored in the single line memory according to an exemplary embodiment of the present invention.

Since the anchor address maintains a fixed value for every 8 pixels, the write enable bar wen for writing the anchor address into the address buffer 1144 can be activated(i.e., logic low) anytime during 8 clocks. The write enable wen may be activated at every first clock as illustrated in FIG. 20. If the write enable wen is activated (becomes logic low), the anchor addresses 0, 80, 160, 240, . . . , 560, 1, 81, . . . , which are read out from the address buffer 1142, are stored in the address buffer 1144 from 0 to 639 in sequence referring to the incremented write address waddr_anchor.

Meanwhile, the common read/write address is generated by the address controller 1148 based on the anchor address output from the address buffer 1142 according to Equation 3 or 4. For example, the common read/write addresses are generated in this order 0~7, 640~647, 1280~1287, 1920~1927, . . . , 4480~4487, . . . , 8~15, 648~655 . . . The read operation is performed on the line memory 1120 according to the generated common read/write address and at the same time image data of new 8 lines are written in to the line memory 120 according to the generated common read/write address.

Likewise, if all the image data of new 8 lines are written into the line memory 120, the selection signal of the multiplexing means is shifted to low state again. Thus, the address buffer 1142 operates on a write mode again, and the address buffer 1144 operates on a read operation again. The MUX 1146 selects the anchor address output from the address buffer 1144 and the output anchor address is input into the address buffer 1142 and the address controller 1148.

The read address raddr_anchor is applied to the address buffer 1144 to obtain an anchor address, and the obtained anchor addresses are stored in the address buffer 1142 in sequence referring to the write address waddr_anchor. The address controller 1148 synthesizes common read/write address based on the anchor address obtained from the address buffer 1144. Referring to the generated common read/write address, the line memory 1120 is read out and at the same time the image data of another new 8 lines are stored.

If the read and write operations are complete with the line memory 1120, the selection signal of the multiplexing means is shifted to a high state again.

The foregoing steps are repeated until a frame of image data (480*640 pixels) is completely processed. After image data of last 8 lines are written into the line memory 1120, only a read operation is performed with the line memory 1120 referring to the common read/write address. Likewise, when first 8 lines of image data are output from the image data processor, only a write operation is performed on the line memory 1120.

Figure 21:
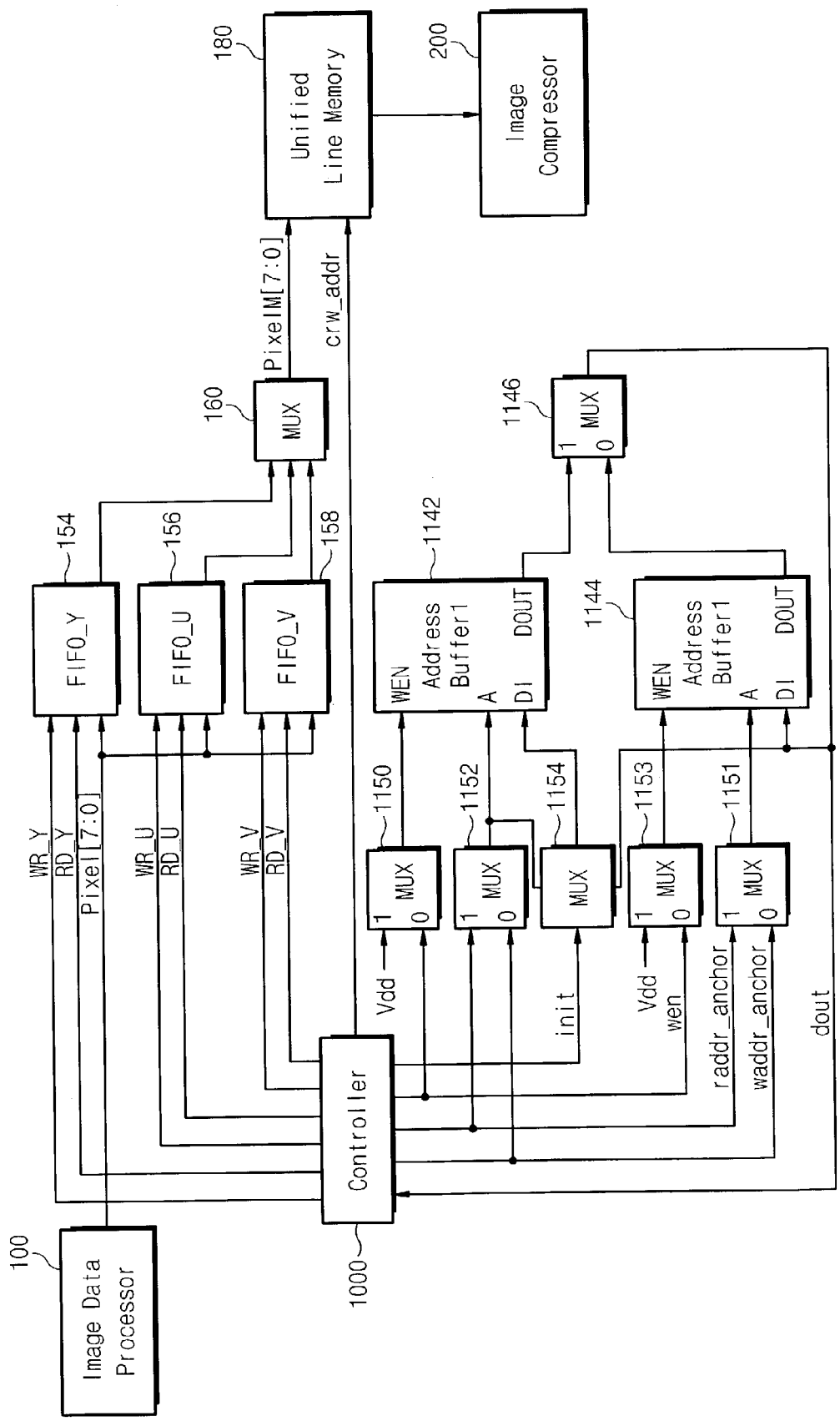
FIG. 21 illustrates another exemplary embodiment of the present invention, namely the combination of the embodiments illustrated in FIGS. 4 and 11.

FIG. 21 illustrates another exemplary embodiment of the present invention, namely the combination of the embodiments illustrated in FIGS. 4 and 11.

According to exemplary embodiments of the present invention as described above, the anchor addresses stored in the first address buffer in sequence are read out by pre-set read addresses (i.e., in a block unit) and stored in the second address buffer in sequence in the read order. The anchor addresses stored in the second address buffer are read out again by the read addresses and stored in the first address buffer in sequence. That is, the anchor addresses are stored in a pair of address buffers, each of which has a size of ⅛ of a line memory. This enables conversion of image data between a raster scan order and a block scan order to be easily embodied by using a single line memory. The read address of the address buffer represents as a fixed pattern, or H/8*vv+i, and the write address also represent a fixed pattern incrementing 0~H−1. The write address pattern may be embodied by using a counter, and the read address pattern also may be embodied by using a shift register and adder. The common read/write address can be obtained by shifting the anchor address read out from the address buffer by 3 bits by shift register and adding 3 bits by adder.

In the foregoing technique, when the image data of first 8 lines are stored in the single line memory, the anchor address is set by dividing the address in which a first pixel of a segment is stored by 8. However, the anchor address can be set in different ways. That is, the anchor address can be set as the address in which a first pixel of a segment is stored. However, the read and write addresses of the address buffers need not be changed from foregoing technique. In case of the common read/write address, in Equation 3, the anchor address f[rd_addr] read out by the read address raddr_anchor may be incremented by only hh, which stands for a horizontal pixel of the segment. Namely, the common read/write address crw_addr equals f[rd_addr]+hh, and the read address raddr_anchor equals vv*640/8+i.

While the method for converting image data of a raster scan order into image data of a block scan order has been described above, the method can also be applied to inverse conversion, i.e., conversion of image data of a block scan order into image data of a raster scan order.

When the exemplary embodiments line buffer system of the present invention, which uses the single line memory as well as a pair of address buffers, and the typical line buffer system, which use a separate line buffer memory by each color component, are applied to VGA standard, the following Table 2 shows comparison of the number of required equivalent gates therebetween.

TABLE 2

| | Typical Line Buffer System | Line Buffer System of The Present Invention |
|---|---|---|
| Number of Memory Bits | 81920 | 52480 |
| Number of Equivalent Gates for Embodying Memory | 79170 | 64471 |

While the number of memory bits of the typical line system using a pair of line memories is 640*8*8*2, or 81920 bits, the number of memory bits of the exemplary embodiments of line buffer system of the present invention is 640*8*8+640*10*2, or 52480 bits. In case that the line memory is embodied from a single port SRAM, the conventional method needs 79170 gates and the exemplary embodiments of the present invention needs 64471 gates.

While exemplary embodiments of the present invention have been described in connection with specific and exemplary embodiments thereof, it is capable of various changes and modifications without departing from the spirit and scope of the invention. It should be appreciated that the scope of the invention is not limited to the detailed description of the invention hereinabove, which is intended merely to be illustrative, but rather comprehends the subject matter defined by the following claims.

According to exemplary embodiments of the present invention, since only one line memory is used with respect to each color component, a size of a memory can be reduced. Therefore, a downsized chip including the line memory can be obtained and a system can operate with low power.

What we claim is:

1. An image processing method for converting image data between a raster format and a block format, the method comprising:
providing image data including a luminance component and at least one chrominance component in the raster format;
storing the image data in a single unified line buffer memory, the image data being stored in the order of 16 luminance components, 8 first chrominance components, and 8 second chrominance components, such that the image data is capable of being simultaneously read from and written to the single unified line buffer memory; and
outputting the image data in a sequence of the block format in response to a common read/write address for the single unified line buffer, the common read/write address being synthesized based on a first anchor address, the first anchor address being stored in a block scan order in a first of a pair of address buffers with respect to an order of a second anchor address stored in a second of the pair of address buffers.

2. The method as claimed in claim 1, wherein storing the image data in the unified line buffer memory comprises:
storing the image data components in respective FIFO memories; and
multiplexing the image data stored in the FIFO memories to the unified line buffer memory.

3. The method as claimed in claim 1, wherein the image data are output as a sequence of blocks in the block format in the order of two blocks of luminance components, one block of first chrominance component, and one block of second chrominance component.

4. An image processing method for converting image data between a raster scan order having a resolution V*H and a block scan order of v*h pixels, comprising:
writing image data of v*H pixels of first v lines linearly into a single line memory, and writing an anchor address having values of 0 to v*H/h−1 into a first address buffer referring to a write address incrementing from 0 to v*H/h−1;
generating a read address given as (H/h)*vv+I, where "I" represents an order of a block of image data of v lines and increments from 0 to (H/h)−1, "vv" represents the number of lines of a block and increments from 0 to v−1 with respect to each I;
reading out the anchor address from the first address buffer referring to the read address and writing the anchor address into a second address buffer referring to the write address, and synthesizing a first common read/write address for the single line memory by multiplying the read anchor address by h and adding hh, which increments from 0 to h−1 with respect to each vv;
reading out the image data of the first v lines from the single line memory referring to the common read/write address, and at the same time writing image data of second v lines into the single line memory referring to the common read/write address;
reading out the anchor address stored in the second address buffer referring to the read address, and synthesizing second common read/write address for the single line memory by multiplying the read anchor address by h and adding hh;
reading out the image data of the second v lines from the single line memory referring to the common read/write address, and writing image data of third v lines into the line memory referring to the second common read/write address; and
repeating the reading out the image data of the first v lines, reading out the anchor address, and reading out the image data of the second v lines until the image data of V lines are completely processed.

5. The image processing method of claim 4, wherein h and v are 8.

6. An image processing method for converting image data between a raster scan order having a resolution V*H and a 8*8 block scan order, comprising:
writing image data of 8*H pixels linearly into a single line memory, and writing an anchor address maintaining a fixed value on every 8 pixels, into a first address buffer referring to a write address;
reading the anchor address stored in the first address buffer with reference to a read address;
storing the anchor address read out from the first address buffer into a second address buffer with reference to the write address, and synthesizing a common read/write address based on the read anchor address;
reading out the image data of 8*H pixels from the single line memory referring to the common read/write address, and at the same time writing image data of next 8*H pixels into the single line memory referring to the common read/write address;
repeating the reading the anchor address, storing the anchor address, and reading out the image data of 8*H pixels until the image data of V*H pixels are completely processed,
wherein every time the reading the anchor address, storing the anchor address, and reading out the image data of 8*H pixels are repeated, the address buffers are alternately referred to by the read and write addresses, the write address increments in sequence from 0 to H−1, and the reading address satisfying (H/8)*vv+I, where "I", represents an order of a block of image data of 8 lines and increments from 0 to (H/8)−1, "vv" represents the number of lines of a block and increments from 0 to 7 with respect to each I, and the common read/writing address is synthesized by multiplying the anchor address read out by the read address by 8 and adding hh incrementing 0~7.

7. The image processing method of claim 6, wherein writing image data of 8*H pixels linearly into a single line memory, the anchor address has a value of 0~H−1, and is stored into the single line memory at address of the same value.

8. An image processing method for converting image data between a raster scan order and a v*h block scan order by using a line buffer system including a unified line buffer memory, comprising:
providing the image data including a luminance component and at least one chrominance component in the raster format;
converting image data between a raster format and a block format, said line buffer system, including
receiving the image data including a luminance component and at least one chrominance component in the raster format and storing corresponding image data components in at least two FIFO memories;
multiplexing the image data components from the at least two FIFO memories;
converting image data between a raster scan order having a resolution V*H and a block scan order of v*h pixels using the unified line buffer memory including,
converting between read and write operation modes having complementary operation modes to each other in at least two address buffers and storing an anchor address;
controlling read operations into and write operations out of the at least two FIFO memories and for providing a read address for the at least two address buffers for the read operation mode and a write address for the at least two address buffers for the write operation mode, and synthesizing a common read/write address to the unified line buffer memory based on the anchor address read out from the pair of address buffers; and
receiving the image data components in block format in sequence from the unified line buffer memory and compressing the received image data components.

9. An image processing apparatus for converting image data between raster scan order and block scan order, comprising:
an image data processor for providing image data including a horizontal resolution H and a vertical resolution V in a raster scan order;
a single line memory for storing image data of v lines;
an address generator for generating a common read/write address for the single line buffer memory; and
an image compressor for receiving image data of a v×h block unit from the single line memory and compressing the received image data, wherein when the image data of v lines are read out from the single line memory in a block scan order referring to the common read/write address, next image data of v lines are written into the single line memory with reference to the same common read/write address; wherein the address generator includes,
a pair of address buffers for storing an anchor address, and an address controller for synthesizing the common read/write address based on the anchor address, and
the anchor address has values of 0~H*v/h−1, which increments on every h pixels of v*H pixels of image data of v line, and an anchor address is stored in one of the pair of address buffers in a block scan order with respect to an order of an anchor address stored in the other of the two address buffers, wherein
a plurality of anchor addresses are generated per macroblock.

10. The image processing apparatus of claim 9, wherein h and v is 8.

11. The image processing apparatus of claim 9, wherein the anchor address stored in the one of the two address buffers is f[n] and f[n] is an anchor address stored in an mth address of the other of the two address buffers and n equals (H/h)*vv+I, wherein "I" represents a block order of image data of v lines and increments from 0 to (H/h)−1 and "vv" stands for the number of lines of a block and increments from 0 to v−1 with respect to each i.

12. The image processing apparatus of claim 11, wherein the address controller provides a read address for reading out the anchor address from the one address buffer and a write address for writing the anchor addresses read out from the one of the two address buffers into the other of the two address buffer, and wherein the address controller synthesizes the common read/write address by multiplying the anchor address read out from the one of the two address buffers by v and adds hh, wherein hh has a value between, and increments from, 0 to h−1.

13. The image processing apparatus of claim 11, wherein v and h is 8.

14. The image processing apparatus of claim 12, wherein v and h is 8.

15. The image processing apparatus of claim 12, wherein the address controller provides the read address n=(H/h)*vv+I for the one of the two address buffers, and provides the write address between 0 to H−1 for writing the anchor address read out by the read address n=(H/h)*vv+I into the other of the two address buffers, and wherein the write address increments from 0 to H−1.

16. The image processing apparatus of claim 15, wherein when the next image data of v lines are read out from the single line memory and next following image data of v lines are written into the single line memory, the address controller provides the read address n=(H/h)*vv+I so as to read out the anchor address from the one of the two address buffers, and provides the write address so as to write the anchor address read out from the one of the two address buffers into the other of the two address buffers, and wherein the write address increments from 0 to H−1.

17. An image processing apparatus for converting image data between a raster format and a block format, the apparatus comprising:
an image data processor for providing the image data including a luminance component and at least one chrominance component in the raster format;
a line buffer system for converting image data between a raster format and a block format, said line buffer system including
at least two FIFO memories for receiving the image data including a luminance component and at least one chrominance component in the raster format and storing corresponding image data components, a multiplexer for multiplexing the image data components from the at least two FIFO memories;

a unified line buffer memory for storing outputs of the multiplexer;

an address generator for converting image data between a raster scan order having a resolution V*H and a block scan order of v*h pixels using the unified line buffer memory, the address generator including, at least two address buffers, each of the at least two address buffers converting repeatedly between read and write operation modes having complementary operation modes to each other, and storing an anchor address;

a controller for controlling read operations into and write operations out of said at least two FIFO memories and for providing a read address for the at least two address buffers for the read operation mode and a write address for the at least two address buffers for the write operation mode, and synthesizing a common read/write address to the unified line buffer memory based on the anchor address read out from the pair of address buffers; and an image compressor for receiving the image data components in block format in sequence from the unified line buffer memory and compressing the received image data components.

* * * * *